United States Patent
Ahmavaara et al.

(10) Patent No.: US 8,755,797 B2
(45) Date of Patent: Jun. 17, 2014

(54) METHODS AND APPARATUS FOR CONTROLLING PROVISIONING OF A WIRELESS COMMUNICATION DEVICE

(75) Inventors: Kalle Ilmari Ahmavaara, San Diego, CA (US); Vineet Mittal, San Diego, CA (US); Federico Nienstadt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/474,518

(22) Filed: May 17, 2012

(65) Prior Publication Data

US 2012/0295618 A1    Nov. 22, 2012

Related U.S. Application Data

(60) Provisional application No. 61/487,655, filed on May 18, 2011.

(51) Int. Cl.
 *H04W 4/00* (2009.01)
(52) U.S. Cl.
 USPC .................................................. 455/435.1
(58) Field of Classification Search
 USPC ........... 455/432.1, 524, 418, 456.2, 411, 450, 455/558, 518, 433, 414.1, 410; 718/104; 370/352, 466, 395.54, 389, 401; 379/279, 201.03
 See application file for complete search history.

(56) References Cited

U.S. PATENT DOCUMENTS

| | | | |
|---|---|---|---|
| 6,697,620 B1 | 2/2004 | Lamb et al. | |
| 6,725,056 B1 * | 4/2004 | Moles et al. | 455/524 |
| 8,150,392 B1 * | 4/2012 | McConnell et al. | 455/432.1 |
| 2005/0202816 A1 * | 9/2005 | Warsta et al. | 455/433 |
| 2006/0035631 A1 * | 2/2006 | White et al. | 455/418 |
| 2008/0108321 A1 | 5/2008 | Taaghol et al. | |
| 2010/0273462 A1 * | 10/2010 | Thorn et al. | 455/414.1 |

FOREIGN PATENT DOCUMENTS

| | | |
|---|---|---|
| EP | 1065904 A1 | 1/2001 |
| WO | 2009053918 A2 | 4/2009 |

OTHER PUBLICATIONS

International Search Report and Written Opinion—PCT/US2012/038665—ISA/EPO—Aug. 29, 2012.
Bornschlegl, MaxBORNS. (May 2011). "The Evolution to Subscriber Centricity." MIPRO, 2011 Proceedings of the 34th International Convention, pp. 483-488. Retrieved from http://ieeexplore.ieee.org/stamp/stamp.jsp"tp=&arnumber=5967105.

* cited by examiner

Primary Examiner — Kiet Doan

(57) ABSTRACT

Methods and apparatus for controlling provisioning of a wireless communication device in a cellular network may include maintaining, at a network component, a provisioning status database comprising status information corresponding to provisioning in a home location register of one or more wireless communication devices for one or more cellular networks. In addition, the methods and apparatus may include initiating provisioning or de-provisioning of a wireless communication device for a cellular network in the home location register in response to a triggering event.

30 Claims, 15 Drawing Sheets

METHODS AND APPARATUS FOR CONTROLLING PROVISIONING OF A WIRELESS COMMUNICATION DEVICE

CLAIM OF PRIORITY UNDER 35 U.S.C. §119

The present Application for patent claims priority to Provisional Application No. 61/487,655 entitled "Methods and Apparatus for Controlling Provisioning of a Wireless Communication Device" filed May 18, 2011, and assigned to the assignee hereof and hereby expressly incorporated by reference herein.

BACKGROUND

The described aspects relate to wireless communications, and more particularly to controlling provisioning of one of more wireless communication devices with a home location register (HLR).

The widespread availability of cellular networks, such as 3G and 4G networks worldwide has enabled the proliferation of wireless devices that make use of many applications beyond traditional voice services. These devices rely heavily on the "mobility" feature of cellular networks, both in-network and also across multiple networks (both domestic and international).

One element of the network infrastructure that controls this "roaming" capability is the Home Location Register (HLR). The HLR in conjunction with the Authentication Center (AuC or AC) is a database network node that stores the identity and subscriber data (credentials) of all the users of the 3G network. The information stored in the HLR typically includes permanent data such as the IMSI, authentication keys, permitted supplementary services, and some temporary data. Examples of temporary data stored in the HLR are the current address of the network nodes (SGSN) serving the subscriber/device that is required to support mobility.

The information stored in the HLR can be grouped into the following categories: Subscriber Data, Security Data and Subscriber Location. Most HLR equipment vendors have integrated the AuC/AC functionality in the same node as the HLR. In general, the function of the AuC/AC is to manage the authentication and encryption data over the radio channels.

Since the HLR plays such a critical role in the proper operation of a cellular network, it can be implemented as a distributed database for security, reliability and performance reasons. However, logically there is only one HLR per Mobile Network (PLMN). Moreover, each HLR is typically associated with only a single wireless network carrier. In order to enable widespread, pre-provisioned wireless data connectivity in cellular networks worldwide for a variety of wireless devices, device credentials must be allocated and programmed into the devices and also in the network elements that control access to the cellular networks, in particular the HLR.

For certain mobile applications or services covering a large number of devices worldwide, it may be advantageous to maximize the utilization of available HLR resources. Therefore, there remains a need in the art for dynamically managing the required subscriber data stored in the HLR.

Moreover, newly-developed and large scale mobile data communications service implementations require the pre-provisioning of millions of wireless devices at the factory, where at some point in time, the devices will need to be activated to access mobile networks around the world. In addition, some devices may never require activation while others could be de-activated and re-activated multiple times during the life of the device. Thus, there remains a need in the art for pre-provisioning models that are adapted to new multi-function devices with multiple mobile connectivity alternatives.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of controlling provisioning of a wireless communication device in a cellular network. The method may include maintaining, at a network component, a provisioning status database comprising status information corresponding to provisioning in a home location register of one or more wireless communication devices for one or more cellular networks. The method may also include initiating provisioning or de-provisioning of a wireless communication device for a cellular network in the home location register in response to a triggering event.

Another aspect relates to at least one processor configured to control provisioning of a wireless communication device in a cellular network. The processor may include a first module for maintaining, at a network component, a provisioning status database comprising status information corresponding to provisioning in a home location register of one or more wireless communication devices for one or more cellular networks. In addition, the processor may include a second module for initiating provisioning or de-provisioning of a wireless communication device for a cellular network in the home location register in response to a triggering event.

Another aspect relates to a computer program product. The computer program product may include a computer-readable medium including a first set of codes for causing a computer to maintain, at a network component, a provisioning status database comprising status information corresponding to provisioning in a home location register of one or more wireless communication devices for one or more cellular networks. The computer-readable medium may also include a second set of codes for causing the computer to initiate provisioning or de-provisioning of a wireless communication device for a cellular network in the home location register in response to a triggering event.

Yet another aspect relates to an apparatus. The apparatus may include means for maintaining, at a network component, a provisioning status database comprising status information corresponding to provisioning in a home location register of one or more wireless communication devices for one or more cellular networks. The apparatus may further include means for initiating provisioning or de-provisioning of a wireless communication device for a cellular network in the home location register in response to a triggering event.

Another aspect relates to an apparatus for controlling provisioning of a wireless communication device in a cellular network. The apparatus may include a provisioning status database operable to maintain status information corresponding to provisioning in a home location register of one or more wireless communication devices for one or more cellular networks. The apparatus may also include a home location register manager component operable to initiate provisioning or de-provisioning of a wireless communication device for a cellular network in the home location register in response to a triggering event.

Another aspect relates to a method of controlling provisioning of a wireless communication device in a cellular network. The method may include receiving, from a cellular network having a network identifier, a connection request for establishing a connection with a wireless device. In addition, the method may include determining provisioning data corresponding to a home location register (HLR) to enable connecting the wireless device to the cellular network based on the network identifier, wherein the provisioning data includes a network entity identifier of a specific network entity in the cellular network to use for connecting with the wireless device. The method may further include providing at least a portion of the provisioning data including the network entity identifier to the cellular network.

Another aspect relates to at least one processor configured to control provisioning of a wireless communication device in a cellular network. The processor may include a first module for receiving, from a cellular network having a network identifier, a connection request for establishing a connection with a wireless device. The processor may also include a second module determining provisioning data corresponding to a home location register (HLR) to enable connecting the wireless device to the cellular network based on the network identifier, wherein the provisioning data includes a network entity identifier of a specific network entity in the cellular network to use for connecting with the wireless device. The processor may additionally include a third module for providing at least a portion of the provisioning data including the network entity identifier to the cellular network.

Still another aspect relates to a computer program product. The computer program product may include a computer-readable medium including a first set of codes for causing the computer to receive, from a cellular network having a network identifier, a connection request for establishing a connection with a wireless device. In addition, the computer-readable medium may include a second set of codes for causing the computer to determine provisioning data corresponding to a home location register (HLR) to enable connecting the wireless device to the cellular network based on the network identifier, wherein the provisioning data includes a network entity identifier of a specific network entity in the cellular network to use for connecting with the wireless device. The computer-readable medium may also include a third set of codes for causing the computer to provide at least a portion of the provisioning data including the network entity identifier to the cellular network.

Another aspect relates to an apparatus. The apparatus may include means for receiving, from a cellular network having a network identifier, a connection request for establishing a connection with a wireless device. The apparatus may further include means for determining provisioning data corresponding to a home location register (HLR) to enable connecting the wireless device to the cellular network based on the network identifier, wherein the provisioning data includes a network entity identifier of a specific network entity in the cellular network to use for connecting with the wireless device. In addition, the apparatus may include means for providing at least a portion of the provisioning data including the network entity identifier to the cellular network.

Yet another aspect relates to an apparatus for controlling provisioning of a wireless communication device in a cellular network. The apparatus may include a receiver operable to receive, from a cellular network having a network identifier, a connection request for establishing a connection with a wireless device. The apparatus may also include an activation engine operable to determine provisioning data corresponding to a home location register (HLR) to enable connecting the wireless device to the cellular network based on the network identifier, wherein the provisioning data includes a network entity identifier of a specific network entity in the cellular network to use for connecting with the wireless device; and to provide at least a portion of the provisioning data including the network entity identifier to the cellular network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for implementing "on demand" provisioning and de-provisioning of subscriber data in a Home Location Register (HLR) in a mobile data connectivity infrastructure. In addition, the described aspects may maximize the utilization of available HLR resources and reduce the operational/recurring costs associated with the HLR.

In contrast to the current model of subscriber provisioning at the Point-of-Sale, and the corresponding downstream configuration/update of the required network resources (including the HLR), the described aspects relate to methods and apparatus for pre-provisioning models adapted to new multi-function devices with multiple mobile connectivity alternatives that utilizes a more dynamic activation process that may de-couple the provisioning of subscriber credentials on the device from the configuration of certain network resources (e.g., the HLR) until the user is ready to activate the device.

In addition, described aspects relate to the methods and apparatus for optimizing the initial device subscription storage mechanism (and subsequent subscription modification and/or permanent deletion requirements) without requiring immediate provisioning of the HLR by the use of an HLR frontend, an Activation Engine and a Master Database. By maximizing the efficiency in the use of HLR resources, the costs of providing large-scale service implementations may be reduced.

Figure 1:
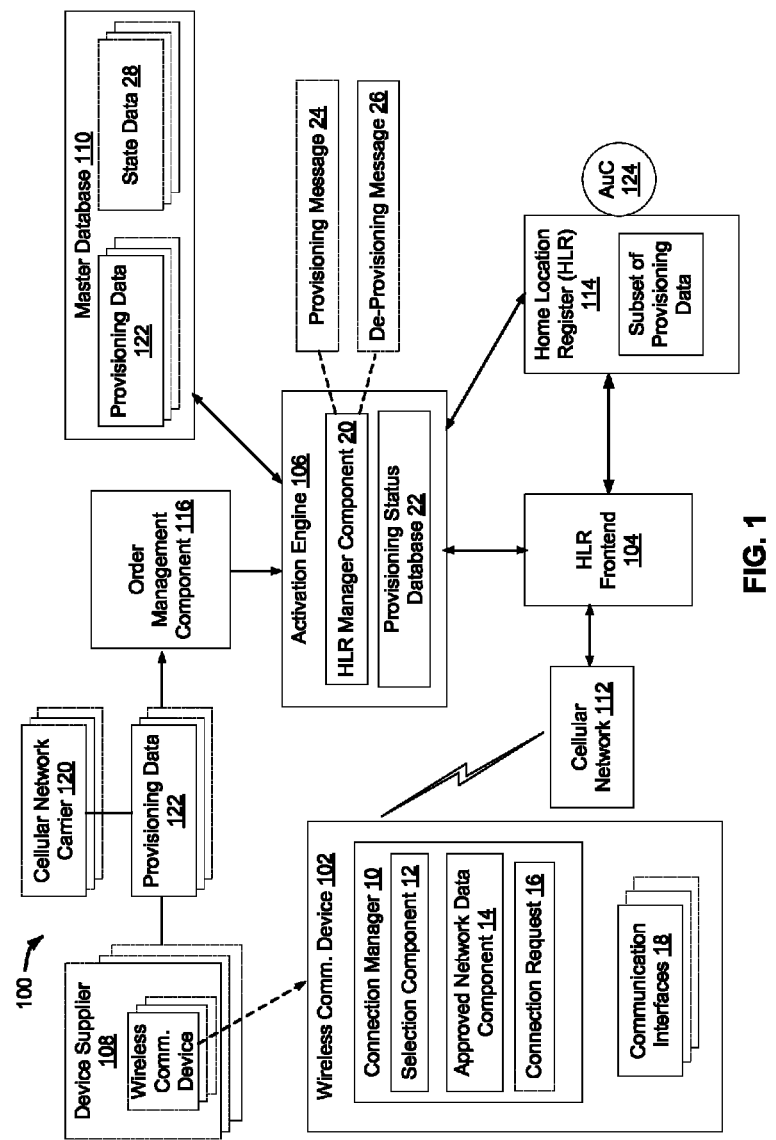
FIG. 1 is an illustration of a connectivity system in accordance with an aspect.

Referring now to FIG. 1, illustrated is an example connectivity system 100 that includes one or more wireless devices 102 communicating with one or more cellular networks 112. Each cellular network 112 may grant or deny access to each wireless device 102 based on on-demand provisioning of a home location register (HLR) 114 as controlled by an activation engine 106, which communicates with cellular network 112 via an HLR frontend component 104. Moreover, activation engine 106 obtains provisioning data 122 from an order management component 116, and controls the storage of the provisioning data in a master database 110 and the selective loading and removing of selected provisioning data for a selected wireless device between master database 110 and HLR 114, as described herein.

In one aspect, which should not be construed as limiting, the described aspects may efficiently manage usage of HLR 114 for a plurality of wireless communication devices 102, such as computer devices with wireless modems produced by one or more device suppliers 108, where many of the wireless devices 102 may have different levels of interaction with cellular networks 112. As such, rather than pre-load HLR 114 with records including the provisioning data for each wireless device and each cellular network, some of which may be rarely or never needed, the described aspects include activation engine 106 to manage storage of the provisioning data in master database 110 until a corresponding wireless device 102 requests connectivity to cellular network 112, thereby triggering loading of the corresponding provisioning data into HLR 114. Further, activation engine 106 manages the removal of provisioning data from HLR 114 based on one or more conditions, such as an available provisioning data storage capacity relative to a threshold, or an inactivity of the wireless communication device on the cellular network relative to an inactivity threshold level.

In another aspect, which should not be construed as limiting, the described aspects may conveniently manage usage of HLR 114 for a plurality of cellular network carriers 120. In other words, the described aspects provide a universal HLR 114 that operates for more than one wireless network carrier.

For example, in the scenario described above, device suppliers may obtain provisioning data from one or more participating wireless network carriers corresponding to one or more cellular networks operated by each carrier. Accordingly, the described aspects avoid the need, by the device supplier, to specifically pre-load or pre-associate each wireless communication device 102 with only a given one of the wireless network carriers. In particular, activation engine 106 has access to master database 110 and the plurality of provisioning data, which may correspond to a plurality of different wireless network carriers and corresponding cellular networks, for each wireless communication device 102. As such, activation engine 106 can load into HLR 114, in an on-demand fashion, any of the provisioning data for any of the cellular networks corresponding to any of the wireless network carriers, thereby providing HLR 114 with the capability of universal wireless network carrier support, Thus, connectivity system 100 allows wireless device 102 to connect to cellular networks 112 in various locations through on-demand provisioning home location register 114 with the provisioning data that allows wireless device 102 to connect to cellular network 112.

In an aspect, which should not be construed as limiting, network provisioning scenarios may include an order management component 116 that may be used by cellular networks 120, e.g., operators, to create a new customer account or subscription, or to update an existing account or subscription with new information related to the products and/or services available to a specific wireless communication device corresponding to a customer or subscriber.

For example, in an aspect, order management component 116 may obtain network provisioning data 122, which may be used to delete, modify and display the different network services such as Data, Voice, GPRS, VMS, MMS, Conferencing, Call Waiting, Call Forwarding, etc., for a specific wireless communication device, e.g., associated with a customer and/or subscriber account.

As such, network provisioning data 122 may be utilized in the process of activating and de-activating customers, e.g., wireless device 102, so that they can use a mobile network.

In one aspect, which should not be construed as limiting, once a new 'Order' has been entered, e.g., based on device supplier producing wireless communication device 102 having cellular connectivity supported by one or more participating wireless network carriers, order management component 116 initiates the network provisioning. For example, order management component 116 may forward provisioning data 122 for one or more wireless communication devices 102 to activation engine 106. Subsequently, activation engine 106 may generate network messages to direct one or more network elements that are responsible for provisioning different network services. The main mobile network elements that have to be provisioned in order to create a new customer account are the Home Location Register (HLR) 114 and/or the Authentication Center (AuC) 124.

As explained previously, the HLR 114 stores details of each wireless communication device, e.g., corresponding to a subscriber that is authorized to use the network. For example, HLR 114 may utilize a device identifier, such as an International Mobile Subscriber Identity number or IMSI to identify a record or an account, including provisioning data, for each wireless communication device. Once a new account has been provisioned onto the HLR, the HLR works in tandem with the AuC 124 to verify that subscribers are allowed to access and use the services of the network. In addition, other parameters related to packet data services may also be part of the provisioning process.

As noted above, rather than directly provisioning HLR 114 upon receipt of provisioning data 122, activation engine 106 instead stores provisioning data 122 in master database 110 to conserve usage of the resources, e.g., the provisioning data record storage capacity, of HLR 114 until such resources are actually needed by wireless communication device 102. Activation engine 106 may include any mobile or fixed server/computing device connected to a network.

For instance, upon usage, wireless device 102 may have a connection manager component 10 operable to determine the available networks for connection with wireless device 102. Wireless device 102 may include any mobile, portable computing or communications device, such as a cellular device, that may connect to an access network. As noted, in an aspect wireless device 102 may be a computer having a cellular modem, however, in other aspects wireless device 102 may include, but is not limited to, a cellular telephone, a navigation system, a computing device, a camera, a PDA, a music device, a gaming device or a handheld device having wireless connection capability, among other devices. In addition, connection manager 10 may be further operable to send connection requests to connect wireless device 102 with the one or more available networks. Connection manager component 10 may include a selection component 12 operable to determine which networks are available for connection with wireless device 102. In an aspect, selection component 12 may determine that access networks, such as Wi-Fi are not available for connection with wireless device 102 and may provide a list of cellular networks 112 that are available for connection with wireless device 102. Selection component may select one of the available cellular networks 112 for connection with wireless device 102.

Alternatively, or in addition, selection component may have one or more user interfaces 18 to prompt a user to select one of the available networks for attempting to provide a connection for wireless device 102. For example, a list of available cellular networks may be displayed on a user interface. Wireless device 102 may receive input from a user with a selection of one of the available networks.

Selection component may also interface with an approved network data component 14 to compare the list of available cellular networks with a list of approved networks prior to selecting one of the available networks for connection. The list of approved networks may be provided by device supplier 108 upon manufacturing of wireless device 102, or via periodic inquires from wireless device 102 to a network component.

For example, in an aspect, this list of approved networks and/or provisioning data 122 may be modified and/or updated by device supplier 108 and/or wireless network carriers 120. For example, device supplier 108 may engage new wireless network carriers 120, and/or may cease relationships with previously used wireless network carriers, or existing provisioning data 122 for a wireless network carrier or a corresponding cellular network may be changed. As such, in an aspect, connection manager 10 may interface with the device supplier 108 and/or activation engine 106 to determine whether the list of approved networks has been updated and may receive any modifications and/or updates for the list of approved networks. It should be appreciated the list of approved network data may be in sync with the network data and provisioning data in the master database 110. In an aspect, approved network data component 14 may communicate with HLR 114, master database 110 and/or activation engine 106 to keep the information delivered to connection manager 10, the HLR 114, and the master database 110 in sync. For example, when an update is received and/or occurs to information at the connection manager 10, the approved network data component 14 may trigger the corresponding updates towards the HLR 114, master database 110, and/or the activation engine 106. Moreover, it should be appreciated that connection manager 10 may obtain some portion of the provisioning data 122 corresponding to each approved network, for example, to enable wireless communication device 102 to initially establish communication with the given cellular network and request connectivity.

Connection manager 10 may further include a connection request component 16 operable to send a connection request to the selected cellular network 112 to request connectivity with the selected cellular network 112.

Cellular network 112 may communicate with HLR frontend component 104, which may forward the connection request to activation engine 106 and hold the connection request from cellular network 112 until receiving a connection decision, e.g., an acknowledgement to allow connectivity or a denial of connectivity, from activation engine 106.

Activation engine 106 may receive the connection request from HLR frontend component 104 and may determine whether wireless device 102 may properly connect to cellular network 112, e.g., based on subscription information, and whether wireless device 102 is already provisioned in HLR 114. In other words, in an aspect, activation engine 106 is triggered to control provisioning of HLR 114 for wireless device 102 by an attempt by the wireless device 102 to connect to the cellular network 112. In an aspect, the connection request from wireless device 102 may include a device identifier, such as the IMSI, as well as a network identifier, such as an identifier of cellular network 112.

For example, if the wireless device 102 is a subscriber to cellular network 112 and already has a record with corresponding provisioning data stored in HLR 114, then activation engine 106 may acknowledge the connection request from HLR frontend 104, and wireless device 102 may connect with cellular network 112.

On the other hand, if the wireless device 102 is a valid subscriber for cellular network 112 but is not already provisioned in HLR 114, then activation engine 106 may communicate with master database 110 to provision wireless device 102 in HLR 114. As noted, HLR 114 may include a plurality of provisioning data for a plurality of wireless communication devices. As such, activation engine 106 may obtain, from master database 110, a subset of the plurality of provisioning data corresponding to the device identifier and the network identifier and may send a provisioning message with the obtained subset of provisioning data to initiating adding a record to HLR 114.

In an aspect, for example, if a device has been inactive and removed from the HLR, re-provisioning of that device may be possible and may be triggered by the device attempting to use the cellular network. In addition, if a previously-activated device requests a connection to a different network (e.g., in a different country), the HLR may need to be re-provisioned to reflect the provisioning data 122, e.g., the subscription information, relevant for the new network (e.g., access point name "APN").

In an optional aspect, master database 110 may include state data 28 associated with the provisioning data for one or more networks. State data may include, but is not limited to, state information provided by HLR 114 so that if a wireless device is re-provisioned to an HLR the previous state data from the HLR may be included with the provisioning data.

Activation engine 106 may further be operable to remove, de-activate, and/or de-provision wireless device 102 from HLR 114. Wireless device 102 may need to be de-activated from the HLR, for example, when the numbers of records in the HLR reach and/or exceed a threshold level of allowed records. For example, in an aspect that should not be construed as limiting, the threshold level may be a set percentage of total capacity, or may be a figure determined based on the time it takes to delete an existing record to make room for a new record, e.g., in order to avoid or minimize latency in adding the new record caused by the time it takes to remove the existing record to clear space for the new record. In addition, when a previously configured device that has not been in use for a pre-determined period of time and/or will no longer be in use (lost, stolen, discarded, etc. . . . ), activation engine 106 may control de-activation of the device may occur from the HLR. In some aspects, de-activation may be performed in a manner that allows subsequent re-activation of the same device. By de-activating devices from the HLR, the use of available HLR resources, e.g., provisioning record-storing capacity, may be maximized.

Figure 2:
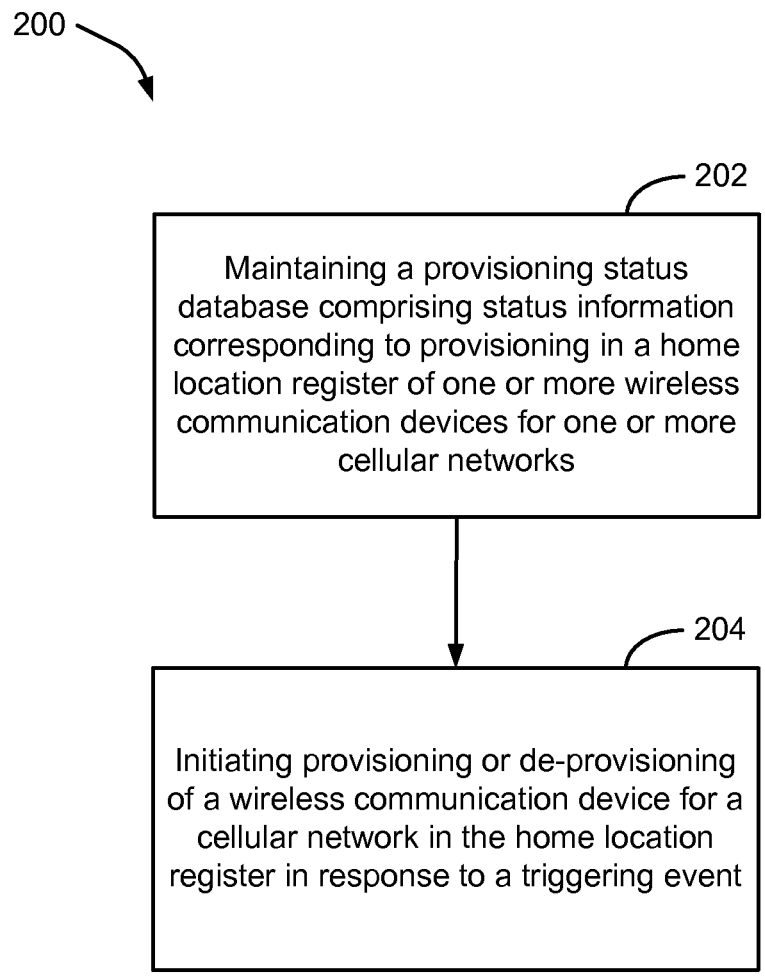
FIG. 2 is a flow chart illustrating a method of controlling provisioning of a wireless communication device in a cellular network in accordance with another aspect.

Referring now to FIG. 2, a method 200 for controlling provisioning of a wireless communication device in a cellular network in accordance with an aspect includes, at 202, maintaining, at a network component, a provisioning status database comprising status information corresponding to provisioning in a home location register of one or more wireless communication devices for one or more cellular networks. For example, activation engine 106 (FIG. 1) may include a provisioning status database 22 (FIG. 1). The provisioning status database 22 may include, but is not limited to, a device identifier field and a network identifier field, among other database fields. In an aspect, the home location register may be configured, for example, to store a plurality of provisioning data corresponding to a plurality of different network carriers. The method may optionally include storing, in a master database, subscription data corresponding to the wireless communication device. For example, activation engine 106 (FIG. 1) may communicate with a master database 110 (FIG. 1) and store subscription data corresponding to wireless device 102 (FIG. 2).

The method may also include, at 204, initiating provisioning or de-provisioning of a wireless communication device for a cellular network in the home location register in response to a triggering event. The triggering event may be based upon receiving signaling corresponding to a request for the wireless communication device to connect to the cellular network. The signaling may include, but is not limited to, a device identifier corresponding to the wireless communication device and a network identifier corresponding to the cellular network, wherein the signaling corresponding to the request comprises the triggering event.

In addition, the triggering event may be based upon an occurrence of a de-provisioning condition. Determining the occurrence of the de-provisioning condition may further include, for example, determining that a capacity for storing provisioning records in the home location register has reached a capacity threshold level. In another aspect, determining the occurrence of the de-provisioning may further include determining that inactivity of the wireless communication device on the cellular network has reached an inactivity threshold level. Determining the occurrence of the de-provisioning condition may also include receiving signaling to release a connection with the cellular network, such as a connection release to disconnect from a cellular network.

The initiating provisioning or de-provisioning may further comprise, for example, transmitting a de-provisioning message destined for the home location register, and the de-provisioning message initiates removing from the home location register a provisioning record comprising provisioning data for the wireless communication device on the cellular network. For example, activation engine 106 may send a provisioning message 24 (FIG. 1) to provision a record in HLR 114 (FIG. 1) with the subscription data for wireless device 102 in response to a triggering event. In addition, activation engine 106 may send a de-provisioning message 26 (FIG. 1) to remove a provisioning record from HLR 114 in response to a triggering event.

In addition, the method may optionally include receiving provisioning data for the wireless communication device and transmitting the provisioning data to a master database for storage until occurrence of the triggering event that causes initiating of the provisioning at the home location register. For example, activation engine 106 may communicate with a master database 110 and store the provisioning data for wireless device 102. In an aspect, transmitting at least a portion of the provisioning data to the wireless communication device may be in response to a provisioning data query received from the wireless device.

Figure 3:
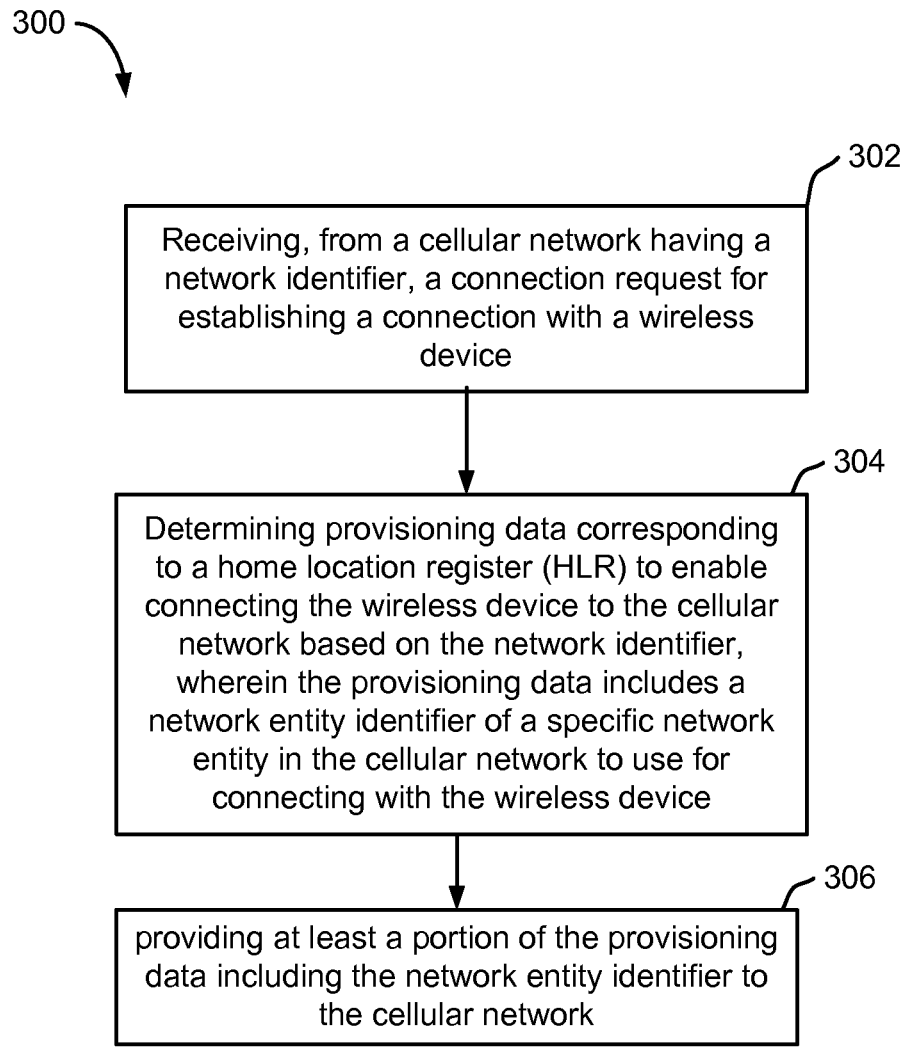
FIG. 3 is a flow chart illustrating a method for controlling provisioning of a wireless communication device in a cellular network in accordance with yet another aspect.

Referring now to FIG. 3, a method 300 for controlling provisioning of a wireless communication device in a cellular network in accordance with an aspect includes, at 302, receiving from a cellular network having a network identifier, a connection request for establishing a connection with a wireless device. In an aspect, the connection request may also include a wireless device identifier, such as an IMSI. For example, activation engine 106 (FIG. 1) may receive a connection request with an IMSI of wireless device 102 (FIG. 1) from cellular network 112 (FIG. 1) to establish a connection with wireless device 102.

The method may also include, at 304, determining provisioning data corresponding to a home location register to enable connecting the wireless device to the cellular network based on the network identifier, wherein the provisioning data includes a network entity identifier of a specific network entity in the cellular network to use for connecting with the wireless device. Provisioning data may include, but is not limited to, the IMSI of the wireless device, the cellular network identification, and a specific network entity (e.g., APN) for providing the services via the cellular network. For example, activation engine 106 may determine provisioning data for HLR 114 to establish a connection between cellular network 112 and wireless device 102.

In addition, the method may include, at 306, providing at least a portion of the provisioning data including the network entity identifier to the cellular network. In an aspect, the network entity identifier (e.g., APN) may identify a local network specific node in the cellular network that is defined for providing services for wireless devices provisioned to the HLR. For example, activation engine 106 may forward the network entity identifier to cellular network 112 to use when establishing a connection with wireless device 102.

The signaling flows for the different events related to device subscription creation and activation, and the corresponding system modules involved in the process of on-demand provisioning the HLR, are illustrated in FIGS. 4-11. The following terms may be referenced in connection with and/or illustrated in the following figures: mobile country code (MCC), mobile network code (MNC), key, e.g., a cryptographic key (K), and access point name (APN).

Figure 4:
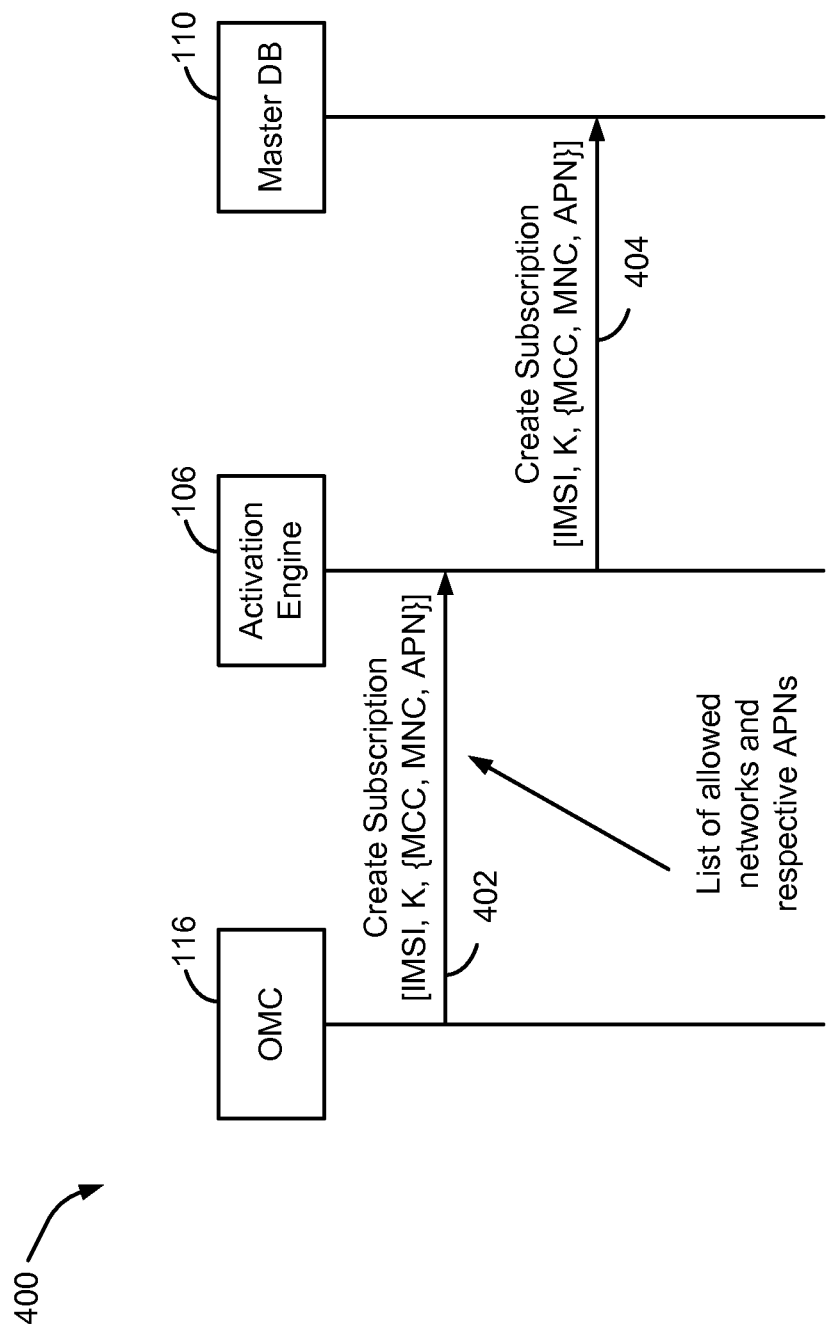
FIG. 4 is a signaling diagram illustrating subscription creation in accordance with an aspect.

Referring now to FIG. 4, illustrated is a signaling diagram 400 for subscription creation in accordance with an aspect. Signal flow 400 describes an initial entry into the master database of the device subscription data (e.g., IMSI, Keys, and Network info—MCC, MNC, APN), while not involving the HLR directly. The master database will contain all the required provisioning data for all devices that have been pre-provisioned at the factory. At 402, activation engine 106 may receive a create subscription message from the order management component 116. The create subscription message may include a list of allowed and/or approved networks and respective APNs that a wireless device may access. In addition, the create subscription message may include a list of network services that the wireless device may use. In an aspect, the create subscription message may include subscription data, such as but not limited to, the IMSI of a wireless device, a key (K), network identification information (e.g., MCC and MNC) for the networks the wireless device may access, and access point names (APN) within the networks that the wireless device may access. For example, order management component 116 may obtain a list of approved networks for use with wireless device 102 (FIG. 1), for example, from a device supplier 108 (FIG. 1) and/or a cellular network carrier 120 (FIG. 1) upon, for example, manufacturing of wireless device 102.

Next, at 404, activation engine 106 may forward the received subscription data sent with the create subscription message to master database 110. Master data base 110 may add a record with the subscription data for wireless device 102 to the master database 110. For example, the master database 110 may add the list of allowed and/or approved networks and respective APNs that the wireless device may access. In addition, the master database may add the network services that the wireless device may use.

Figure 5:
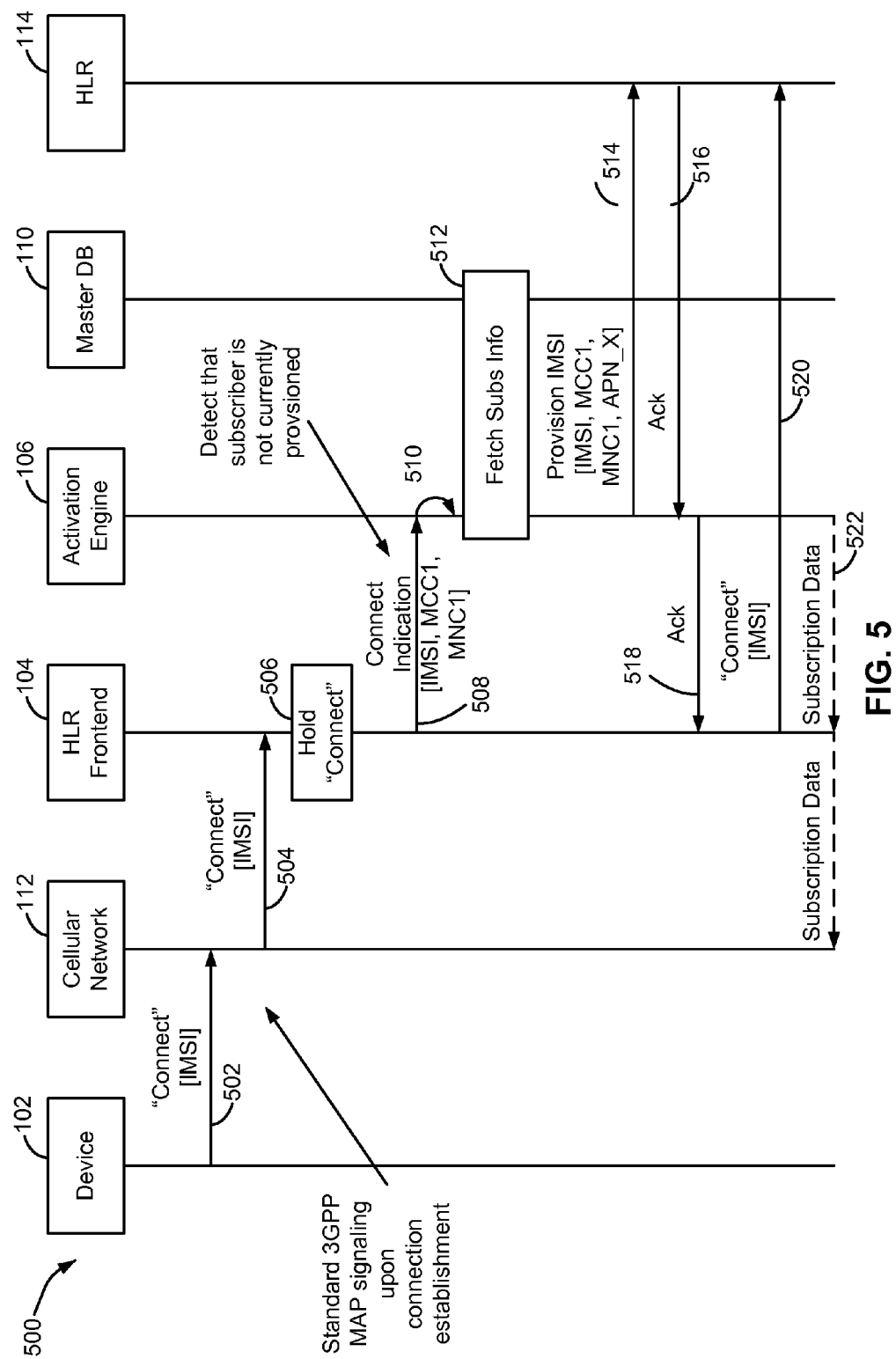
FIG. 5 is a signaling diagram illustrating first time connection establishment in accordance with yet another aspect.

Referring now to FIG. 5, illustrated is a signaling diagram 500 for a first time connection establishment in accordance with yet another aspect. Signaling diagram 500 illustrates a first activation event generated by a device itself that will trigger a provisioning of the HLR, using information already available in the master database. The interaction between the HLR frontend, the Activation Engine and the Master Database, ensures that the new device is provisioned into the HLR only as needed to ensure the most optimized use of HLR resources.

At 502, wireless device 102 may attempt to connect to cellular network 112 by sending a connection request to a selected cellular network 112. For example, a connection request component 16 (FIG. 1) on wireless device 102 may send a connection request to the selected cellular network 112 requesting connectivity with the selected cellular network 112. The connection request may include the IMSI of wireless device 102 and may identify a record or an account for wireless device 102, including provisioning data for the wireless device. In addition, the connection request may include a network identifier corresponding to the selected cellular network 112.

In an aspect, the cellular network may be selected from a list of approved networks. The list of approved networks may include, but are not limited to, a list of networks provided by a device supplier upon manufacturing of the wireless device and/or a list of networks provided by a network component (e.g., an activation engine or a device supplier). It should be appreciated that the wireless device may obtain some portion of the provisioning data corresponding to each approved network, for example, to enable the wireless communication device to initially establish communication with the given cellular network and request connectivity.

At 504, the HLR frontend 104 may receive the connection request forwarded from cellular network 112. The connection request may include the IMSI of wireless device 102 along with the cellular network identification (e.g., MCC and MNC) for cellular network 112.

At 506, the HLR frontend 104 may hold the connection request from cellular network 112 until receiving a connection decision from activation engine 106. For example, HLR frontend 104 may hold the connection request forwarded from cellular network 112 until the activation engine 106 sends an acknowledgement to allow connectivity and/or a denial of connectivity.

Next, at 508, the HLR frontend 104 may send a connection indication message to the activation engine 106. The connection indication message may include, but is not limited to, the IMSI of wireless device 102 and the cellular network identification (e.g., MCC and MNC) for cellular network 112.

At 510, activation engine 106 may determine whether wireless device 102 is provisioned in HLR 114. For example, activation engine 106 may determine whether the subscription information associated with the IMSI of wireless device 102 is currently provisioned in HLR 114. The activation engine may, for example, compare the IMSI and the cellular network identification with the provisioning data stored in the HLR. If there is no match between the IMSI of wireless device and/or the cellular network identification of cellular network 112 and the provisioning data stored in the HLR, the activation engine may determine that the subscription information is not already provisioned in the HLR.

When activation engine 106 determines that wireless device 102 is not provisioned in HLR 114, at 512, activation engine 106 may fetch the subscription information for wireless device 102 from the master database 110. For example, activation engine 106 may communicate with master database 110 and obtain, from master database 110 having a plurality of provisioning data for a plurality of wireless communication devices, provisioning data 122 (FIG. 1) corresponding to the IMSI of wireless device 102 and the cellular network identification of cellular network 112.

Next, at 514, activation engine 106 may send a provisioning message 24 (FIG. 1) to HLR 114 to initiate adding a record to HLR 114 with the provisioning data for wireless device 102. The provisioning message may include provisioning data, such as but not limited to, the IMSI of the wireless device, the cellular network identification, and a specific network entity (e.g., APN) for providing the services via the cellular network. In some cases of this aspect, the provisioning data, and in particular, the specific network entity for providing services may be based on the cellular network identity of the cellular network that the wireless device is attempting to access. Alternatively, or in addition, the provisioning data, and in particular, the specific network entity for providing services may be based on the device identity of the wireless device that is attempting to access the cellular network. Thus, the activation engine may be triggered to provision the HLR for the wireless device by an attempt of the wireless to connect to the cellular network.

At 516, activation engine 106 may receive an acknowledgement from HLR 114 that a provisioning record with the provisioning data for wireless device 102 was added to the HLR 114. In an aspect, activation engine 106 may include a provisioning status database 22 (FIG. 1) with a device identifier field and a network identifier field. Upon receiving an acknowledgement from HLR 114 that the provisioning data was added to the HLR 114, activation engine 106 may update the provisioning status database 22 to indicate that the provisioning data for wireless device 102 is currently provisioned to HLR 114. For example, activation engine 106 may update the device identifier field of the provisioning status database 22 to include the IMSI of wireless device 102. In addition, activation engine 106 may update the network identifier field of the provisioning status database 22 to include the network identifier information for cellular network 112. It should be noted that the HLR may store a plurality of provisioning data corresponding to a plurality of different network carriers.

At 518, the HLR frontend 104 may receive a connection decision from activation engine 106 with an acknowledgment to allow connectivity. Next, at 520, HLR frontend 104 may send a connect message to HLR 114 requesting connectivity to cellular network 112.

It should be noted that in some aspects, at 522, a subsequent response message from the HLR back to the cellular network may include provisioning data that includes a network entity identifier of a specific network entity, e.g., APN, to use for connecting with the wireless device by the cellular network. For example, the specific network entity may include a local network specific gateway node in the cellular network that is defined for providing services via the cellular network for wireless devices provisioned to the HLR.

Figure 6:
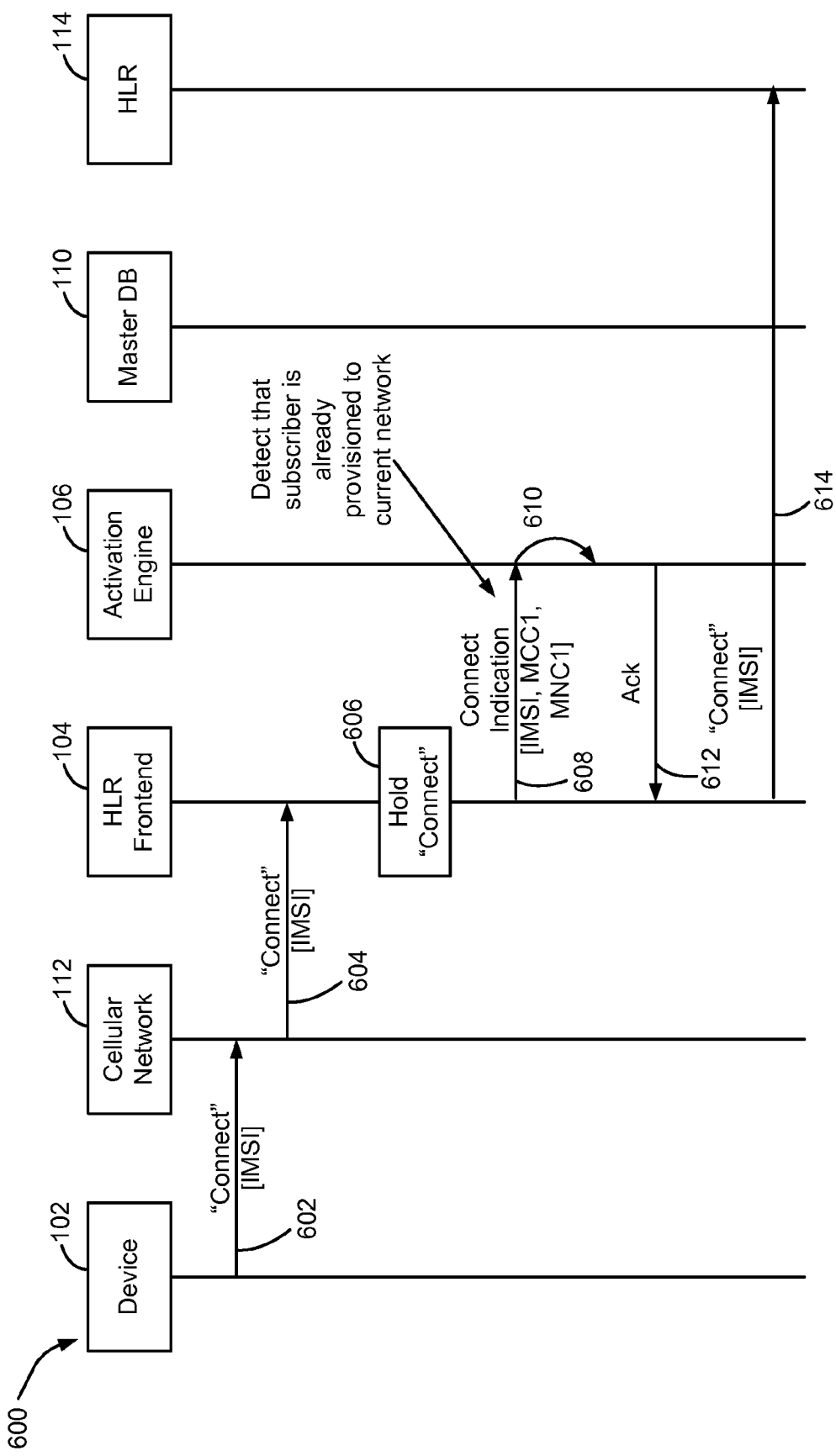
FIG. 6 is a signaling diagram illustrating subsequent connection establishment in accordance with an aspect.

Referring now to FIG. 6, illustrated is signaling diagram 600 for subsequent connection establishment in accordance with an aspect. Signaling flow 600 illustrates the interaction between a device, the HLR frontend and the Activation Engine to determine if the device is already activated and provisioned in the HLR. It should be noted that signals 602-610 may be similar to the signals as described above in regards to 502-510. At 602, wireless device 102 may attempt to connect to cellular network 112 by sending a connection request to cellular network 112. Next, at 604, HLR frontend 104 may receive the connection request forwarded from cellular network 112. At 606, the HLR frontend 104 may hold the connection request from cellular network 112 until receiving a connection decision from activation engine 106 (e.g., an acknowledgement to allow connectivity and/or a denial of connectivity). Further, at 608, the HLR frontend 104 may send a connection indication message including the IMSI of wireless device 102 and the cellular network identification (e.g., MCC and MNC) for cellular network 112 to activation engine 106.

At 610, activation engine 106 may determine whether wireless device 102 is provisioned in HLR 114. For example, activation engine 106 may determine whether the subscription information for the requested cellular network 112 associated with the IMSI of wireless device 102 is currently provisioned in HLR 114. Activation engine 106 may include a provisioning status database 22 (FIG. 1) which may indicate whether a wireless device is provisioned in HLR 114. The activation engine may, for example, compare the received IMSI with the device identifier field of the provisioning status database. In addition, the activation engine may compare the received cellular network identification with the network identifier field of the provisioning status database. When the IMSI and the cellular network identification matches provisioning data stored in the device identifier field and network identifier filed of the provisioning status database, the activation engine may determine that the subscription information for the cellular network is already provisioned in the HLR.

Next, at 612, activation engine 106 may send a connection decision to the HLR frontend 104 with an acknowledgement to allow connectivity to cellular network 112. At 614, the HLR frontend 104 may send a connect message to HLR 114 requesting connectivity with cellular network 112.

Figure 7:
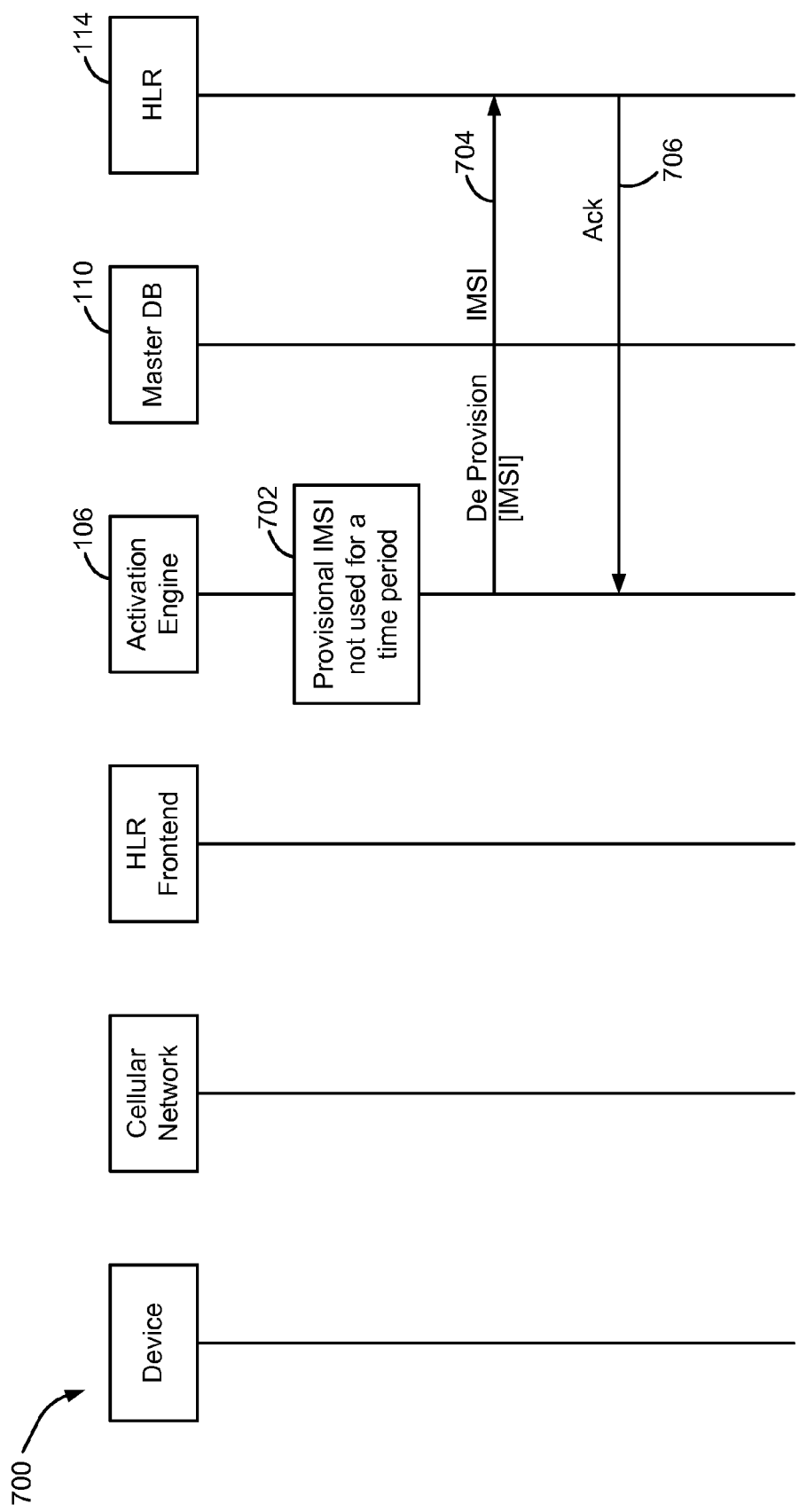
FIG. 7 is a signaling diagram illustrating subscription deactivation in accordance with still another aspect.

Referring now to FIG. 7, illustrated is signaling diagram 700 for subscription deactivation in accordance with an aspect. Signaling diagram 700 illustrates the Activation Engine determining, based on a set of pre-arranged criteria, if a device needs to be de-activated and the configuration data of the device removed from the HLR. At 702, activation engine 106 may determine that a deactivation and/or a de-provisioning condition occurred for an IMSI of a wireless device. Determining an occurrence of a deactivation and/or a de-provisioning condition may include, for example, determining that a capacity for storing provisioning records in the home location register has reached a capacity threshold level. For example, in an aspect that should not be construed as limiting, the capacity threshold level may be a set percentage of total capacity, or may be a figure determined based on the time it takes to delete an existing record to make room for a new record, e.g., in order to avoid or minimize latency in adding the new record caused by the time it takes to remove the existing record to clear space for the new record. In another aspect, determining the occurrence of the deactivation and/or de-provisioning condition may include determining that inactivity of the wireless communication device associated with the IMSI on the cellular network has reached an inactivity threshold level. Further, for example, the deactivation and/or de-provisioning condition may occur when a previously configured device has not been in use for a predetermined period of time and/or will no longer be in use (lost, stolen, discarded, etc. . . . ).

At 704, activation engine 106 may send a de-provisioning message 26 (FIG. 1) destined for HLR 114. The de-provisioning message may include the IMSI of the wireless device associated with the subscription information. In an aspect, the de-provisioning message may initiate the removal from the home location register a provisioning record comprising provisioning data for the wireless communication device associated with the IMSI on the cellular network. Thus, the activation engine may be triggered to de-provision the HLR for the wireless device by the occurrence of a deactivation and/or de-provisioning condition.

Next, at 706, activation engine 106 may receive an acknowledgment from HLR 114 that the provisioning record associated with the IMSI of the wireless device has been removed from HLR 114. For example, activation engine 106 may include a provisioning status database 22 (FIG. 1) which may indicate whether a wireless device is provisioned in HLR 114. Thus, when activation engine 106 receives an acknowledgement from HLR 114 that the provisioning record associated with wireless device 102 (FIG. 1) has been removed from HLR 114, activation engine 106 may update the provisioning status database 22 to indicate that the provisioning record associated with wireless device 102 is not currently provisioned in HLR 114. In some aspects, de-activation may be performed in a manner that allows subsequent re-activation of the same device. By de-activating devices from the HLR, the use of available HLR resources, e.g., provisioning record-storing capacity, may be maximized Illustrated in FIGS. 8 and 9 are the cases where the previously-activated device may need to be re-activated, either because it was de-activated based on the criteria used by the Activation Engine and its configuration information removed from the HLR, or because the device is active but it is attempting to connect to a different network (e.g., in a different country).

Figure 8:
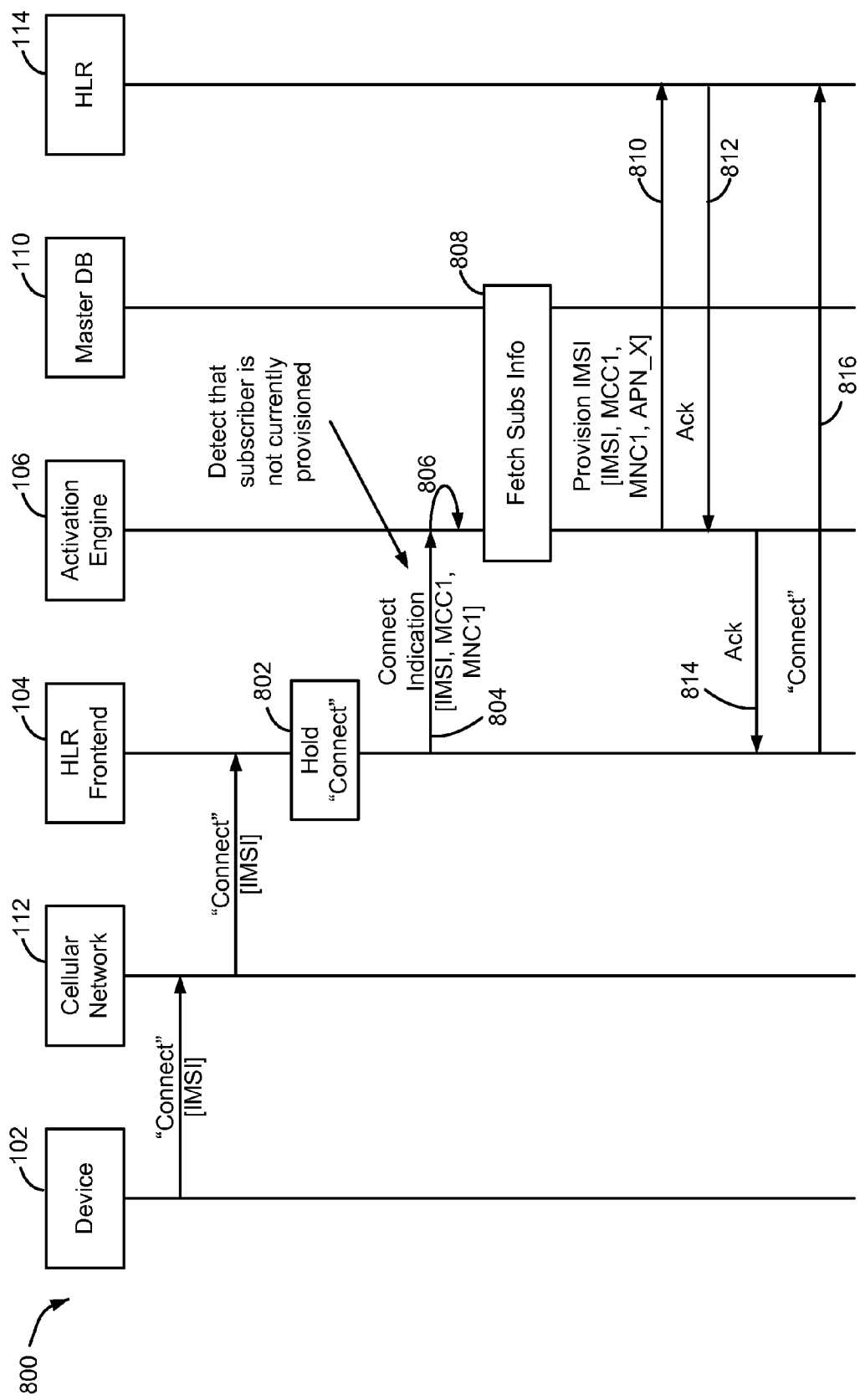
FIG. 8 is a signaling diagram illustrating reactivation of a deactivated subscription in accordance with an aspect.
Figure 9:
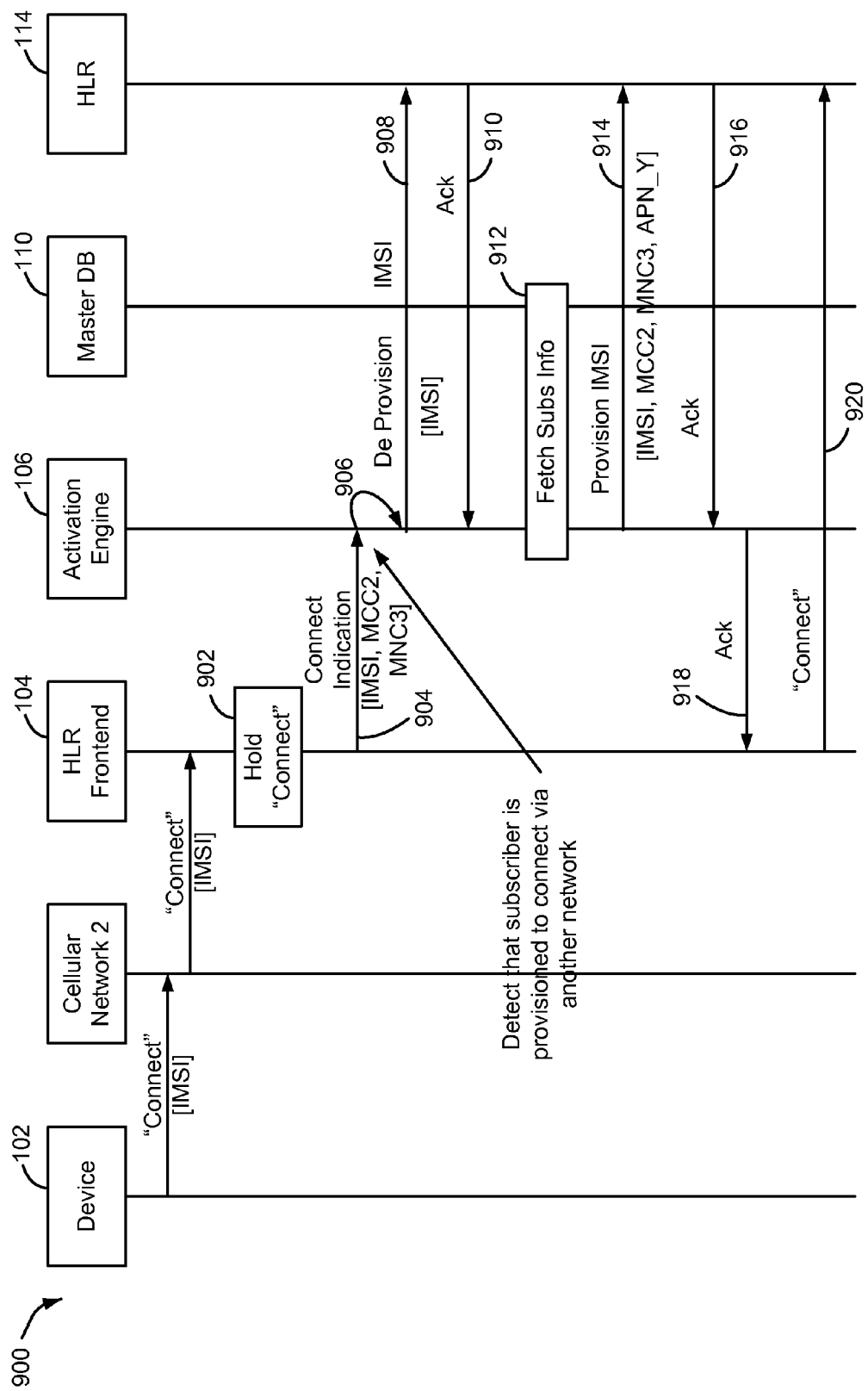
FIG. 9 is a signaling diagram illustrating reactivation of an active subscription in accordance with yet another aspect.

Referring now to FIG. 8, illustrated is signaling diagram 800 for reactivation of a deactivated subscription in accordance with an aspect. Signaling diagram 800 illustrates an aspect where the device has been de-activated, as illustrated in FIG. 7, and the device configuration was removed from the HLR. As illustrated in FIG. 8, re-activation will re-provision the HLR with the appropriate data.

At 802, the HLR frontend 104 may hold the connection request received from cellular network 112 until receiving a connection decision from activation engine 106 (e.g., an acknowledgement to allow connectivity and/or a denial of connectivity). At 804, the HLR frontend 104 may forward the connect indication message to activation engine 106. As discussed above in FIG. 5, the connect indication message may include the IMSI of wireless device 102 and the network identification information (e.g., MCC1 and MNC1) for cellular network 112.

Next, at 806, activation engine 106 may determine whether wireless device 102 is provisioned in HLR 114. In an aspect, activation engine 106 may include a provisioning status database 22 (FIG. 1) which may indicate whether wireless device 102 is already provisioned in HLR 114. When wireless device 102 is not currently provisioned in HLR 114, the provisioning status database 22 indicates that wireless device 102 is not provisioned in HLR 114. The provisioning data associated with the wireless device may have been de-activated from the HLR, as illustrated in FIG. 7.

Upon determining that the subscription information for wireless device 102 is not currently provisioned in HLR 114, at 808, activation engine 106 may fetch the subscription information for wireless device 102 from the master database 110. For example, activation engine 106 may communicate with master database 110 and obtain, from master database 110, provisioning data 122 (FIG. 1) corresponding to the IMSI of wireless device 102 and the cellular network identification corresponding to cellular network 112.

Next, at 810, activation engine 106 may send a provisioning message 24 (FIG. 1) with the subscription information to re-provision the subscription information for wireless device in HLR 114. The provisioning message may include provisioning data, such as but not limited to, the IMSI of the wireless device, the cellular network identification, and a specific network entity (e.g., APN) for providing the services via the cellular network. In some cases of this aspect, the provisioning data, and in particular, the specific network entity for providing services may be based on the cellular network identity of the cellular network that the wireless device is attempting to access. Alternatively, or in addition, the provisioning data, and in particular, the specific network entity for providing services may be based on the device identity of the wireless device that is attempting to access the cellular network.

At 812, activation engine 106 may receive an acknowledgement from HLR 114 that a provisioning record with the provisioning data for wireless device 102 was added to HLR 114. In an aspect, the activation engine 106 may update the provisioning status database 22 to indicate that the provisioning data associated with wireless device 102 is currently provisioned to HLR 114.

At 814, the HLR frontend 104 may receive a connection decision (e.g., an acknowledgment to allow connectivity) from activation engine 106. Next, at 816, the HLR frontend 104 may send a connect message to HLR 114 requesting connectivity to cellular network 112.

Referring now to FIG. 9, illustrated is signaling diagram 900 for reactivation of an active subscription in accordance with an aspect. Signaling diagram 900 illustrates an aspect where a previously activated device will need to be re-provisioned in the HLR with a new profile for the new network. It should be appreciated that, in an aspect, only one provisioning record is maintained at the HLR per device.

At 902, the HLR frontend 104 may hold the connection request received from cellular network 2 until receiving a connection decision from activation engine 106 (e.g., an acknowledgement to allow connectivity and/or a denial of connectivity). At 904, the HLR frontend 104 may forward the connect indication message to the activation engine 106. The connect indication message may include the IMSI of wireless device 102 requesting the connection to cellular network 2 and the network identification information for cellular network 2 (e.g., MCC2 and MNC3).

Next, at 906, activation engine 106 may determine that wireless device 102 is provisioned to connect via another cellular network. For example, activation engine 106 may include a provisioning status database 22 (FIG. 1) which may determine that wireless device 102 is already provisioned in HLR 114 for another cellular network, e.g., cellular network 112. The activation engine may, for example, compare the received IMSI with the device identifier field of the provisioning status database. In addition, the activation engine may compare the received cellular network identification with the network identifier field of the provisioning status database. In an aspect, when the device identifier field matches the IMSI but the received cellular network identification information (e.g., MCC2 and MNC3) does not match the cellular network identification information (e.g., MCC1 and MNC1) in the network identifier field, the activation engine may determine that the wireless device is provisioned to connect to another cellular network instead of cellular network 2.

Upon the activation determining that the subscriber is provisioned to connect to another cellular network, at 908, the activation engine 106 may send a de-provisioning message 26 (FIG. 1) to HLR 114 to de-provision the subscription information from HLR 114. The de-provisioning message may include, for example, the IMSI of wireless device 102 associated with the subscription information in the HLR.

At 910, activation engine 106 may receive an acknowledgement from HLR 114 that a provisioning record with the subscription information associated with the IMSI of wireless device 102 has been removed from HLR 114. In some aspects, as discussed above in FIG. 7, de-provisioning the subscription information from the HLR may be performed in a manner that allows subsequent re-activation of the same device. In addition, the activation engine may update the provisioning status database to indicate that the subscription information for wireless device 102 has been removed from HLR 114.

Next, at 912, activation engine 106 may fetch the subscription information for wireless device 102 associated with cellular network 2 from master database 110. It should be noted that the master database may include subscription information for each cellular network that a wireless device is capable of accessing. Therefore, the activation engine may receive different subscription information for a wireless device from the master database depending on which cellular network the wireless device is attempting to connect with.

At 914, activation engine 106 may send a provisioning message 24 (FIG. 1) to HLR 114 to provision HLR 114 with the subscription information for wireless device 102. The provisioning message may include provisioning data, such as but not limited to, the IMSI of the wireless device, the cellular network identification for cellular network 2 (e.g., MCC2 and MNC3), and a specific network entity (e.g., APN_Y) for providing the services via cellular network 2. It should be noted that, in an aspect, only one provisioning record is maintained at the HLR per wireless device. In addition, the provisioning records maintained at the HLR may dynamically change based upon what cellular network the wireless device is connecting with.

Next, at 916, activation engine 106 receives an acknowledgment from HLR 114 that a provisioning record with the provisioning data was added to the HLR 114. In an aspect, upon receiving an acknowledgement from HLR 114 that the provisioning data was added to the HLR 114, activation engine 106 may update the provisioning status database 22 to indicate that the provisioning data is currently provisioned to HLR 114. For example, activation engine 106 may update the device identifier field of the provisioning status database 22 to include the IMSI of wireless device 102. In addition, activation engine 106 may update the network identifier field of the provisioning status database 22 to include the network identifier information for cellular network 2.

At 918, the HLR frontend 104 may receive a connection decision from activation engine 106 with an acknowledgment to allow connectivity. At 920, the HLR frontend 104 may send a connect message to HLR 114 requesting connectivity to cellular network 2.

Figure 10:
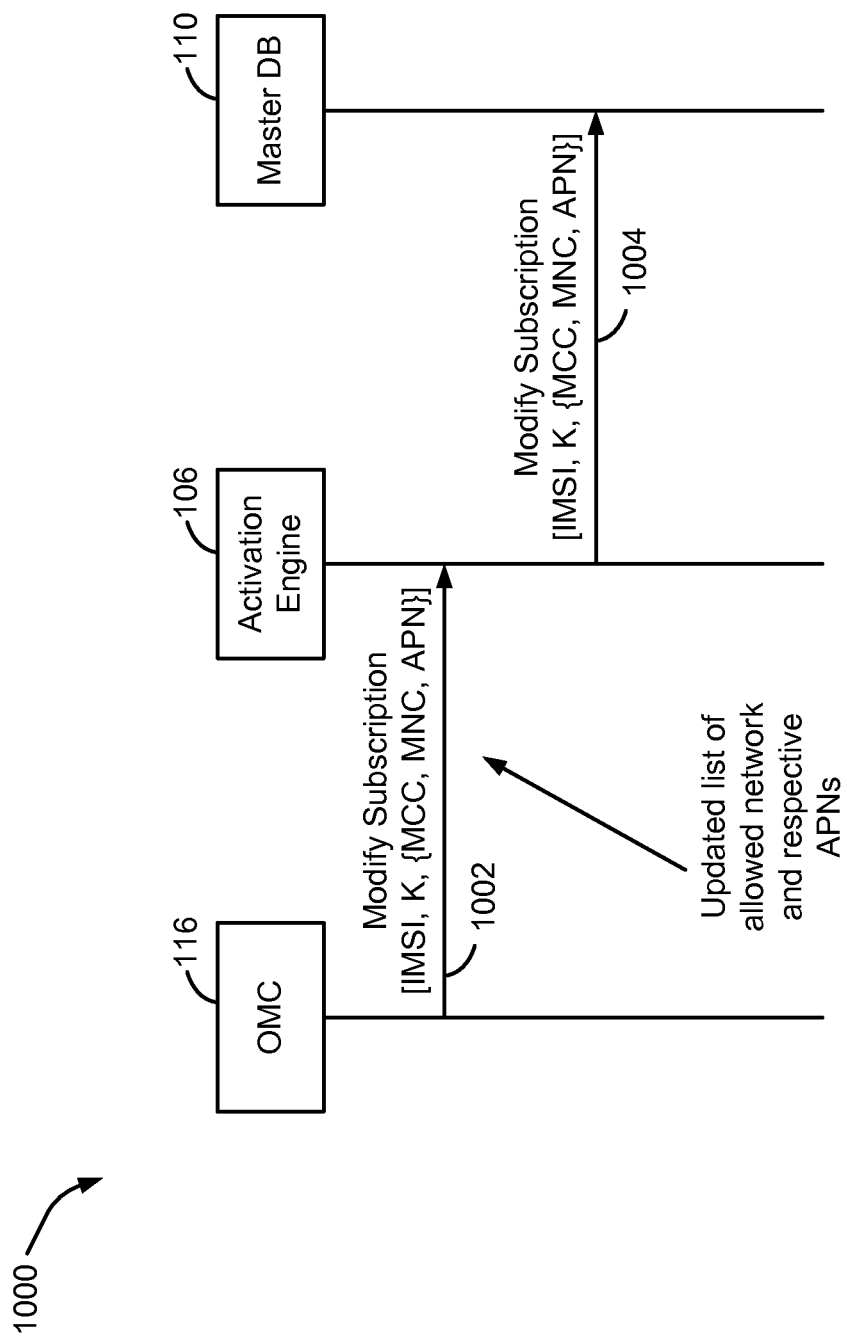
FIG. 10 is a signaling diagram illustrating subscription modification in accordance with another aspect.

Referring now to FIG. 10, illustrated is signaling diagram 1000 for subscription modification in accordance with an aspect. Signaling diagram 1000 illustrates an aspect that does not involve the HLR but relies on the Activation Engine and the Master Database to modify the device subscription information. The modification to the device subscription can occur either before or after the First Activation occurs.

At 1002, the activation engine 106 may receive a modify subscription message from the order management component 116. The modify subscription message may include updated network services such as Data, Voice, GPRS, VMS, MMS, Conferencing, Call Waiting, Call Forwarding, etc., for a wireless device. In addition, the modify subscription message may include an updated list of allowed and/or approved networks and respective APNs that a wireless device may access. The list of approved networks and/or provisioning data may be modified and/or updated by a device supplier and/or a wireless network carrier. For example, device supplier 108 (FIG. 1) may engage new wireless network carriers 120 (FIG. 1), and/or may cease relationships with previously used wireless network carriers, or existing provisioning data 122 (FIG. 1) for a wireless network carrier or a corresponding cellular network may be changed.

In an aspect, the modify subscription message may include, but is not limited to, the IMSI of a wireless device, a key (K), updated network identification information (e.g., MCC and MNC), and updated access point names (APN). For example, order management component 116 may obtain an updated list of approved networks for use with wireless device 102 (FIG. 1), for example, from a device supplier 108 and/or a cellular network carrier 120 (FIG. 1). The updated list of approved networks may be used to modify the subscription data associated with wireless device 102, e.g., associated with a customer and/or subscriber account.

Next, at 1004, activation engine 106 may forward the received modify subscription message to the master database 110. In an aspect, activation engine 106 may forward the received modify subscription message to master database 110 to update the subscription data corresponding to the wireless communication device associated with the IMSI included in the modify subscription message. The master database may modify the subscription data to include the updated list of allowed and/or approved networks and respective APNs that a wireless device may access. In addition, the master database may modify the subscription data to include updated network services provided to the wireless device.

Figure 11:
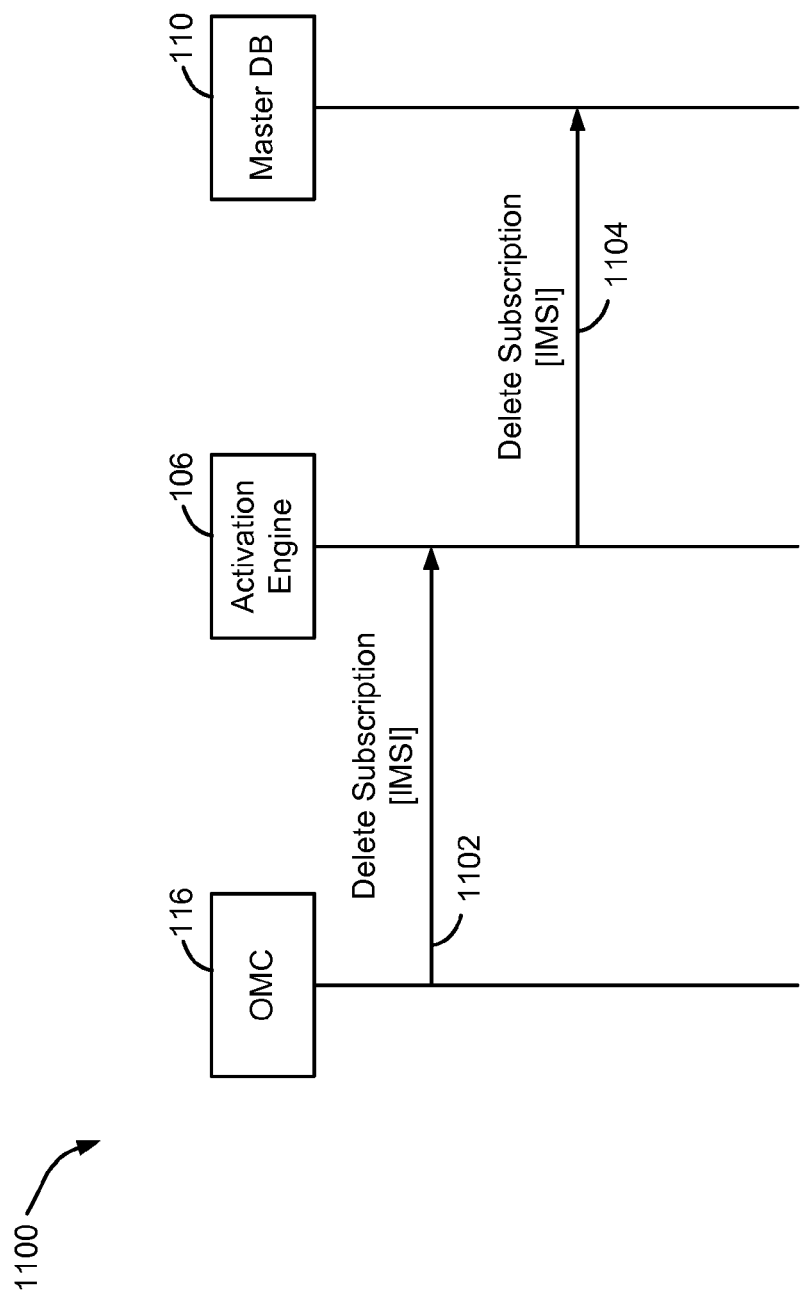
FIG. 11 is a signaling diagram illustrating subscription deletion in accordance with an aspect.

Referring now to FIG. 11, illustrated is signaling diagram 1100 for subscription deletion in accordance with an aspect. Signaling diagram 1100 illustrate an aspect which involves the removal of the device subscription from the Master Database.

At 1102, activation engine 106 may receive a delete subscription message from the order management component 116. For example, order management component 116 may send a delete subscription message including an IMSI of a wireless device to activation engine 106 to remove the subscription data associated with the wireless device from the master database 110. Removal of the device subscription may occur, for example, as a final removal of the device data from the system when no further use is expected.

At 1104, activation engine 106 may forward the received delete subscription message to the master database 110. For example, the master database 110 may delete the subscription data associated with the IMSI of the wireless device.

Figure 12:
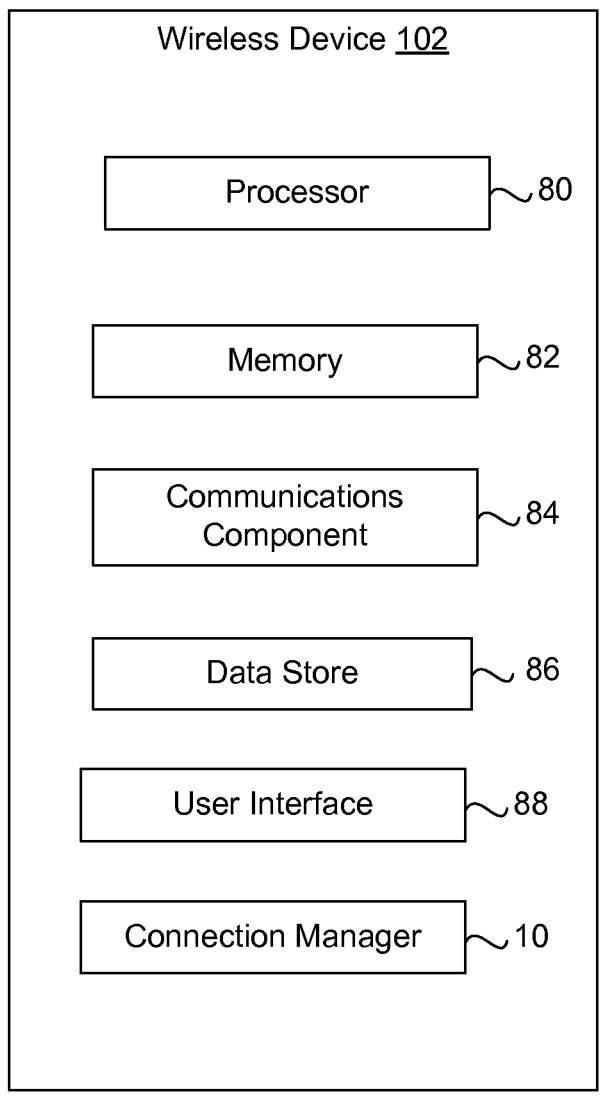
FIG. 12 an example wireless device operable within the connectivity system in accordance with an aspect.

Referring now to FIG. 12, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may further include a connection manager 10 operable to select one or more available networks for wireless device 102 to connect with and send a connection request the selected network.

Figure 13:
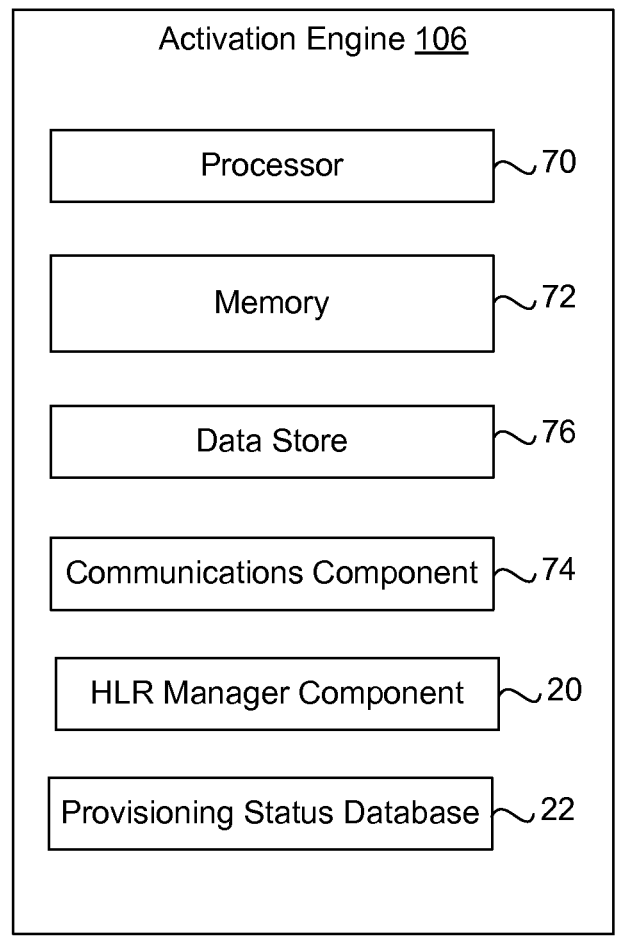
FIG. 13 is an example activation engine operable within the connectivity system in accordance with yet another aspect.

Referring now to FIG. 13, illustrated is an activation engine component 106 operable within the connectivity system in accordance with yet another aspect. Activation engine component 106 manages network connectivity matters for an access network. Activation engine component 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Activation engine component 106 further includes a memory 72, such as for storing local versions of applications being executed by processor component 70. Memory 72 can include random access memory (RAM), read only memory (ROM), and a combination thereof.

Further, activation engine component 106 includes a communications component 34 that provides for establishing and maintaining communications with one or more parties utilizing hardware, software, and services as described herein. Communications component 34 may carry communications between components on activation engine 106, as well as between activation engine component 106 and external devices, such as devices located across a communications network and/or devices serially or locally connected to activation engine 106.

Additionally, activation engine component 106 may further include a data store 76, which can be any suitable combination of hardware and/or software, that provides for mass storage of information, databases, and programs employed in connection with aspects described herein. For example, data store 76 may be a data repository for applications not currently executing.

Activation engine component 106 may include a provisioning status database 22 which may determine whether a wireless device is already provisioned in an HLR. In addition, activation engine component 106 also include an HLR Manager Component 20 which may send provisioning messages 24 and/or de-provisioning messages 26 to the HLR.

Figure 14:
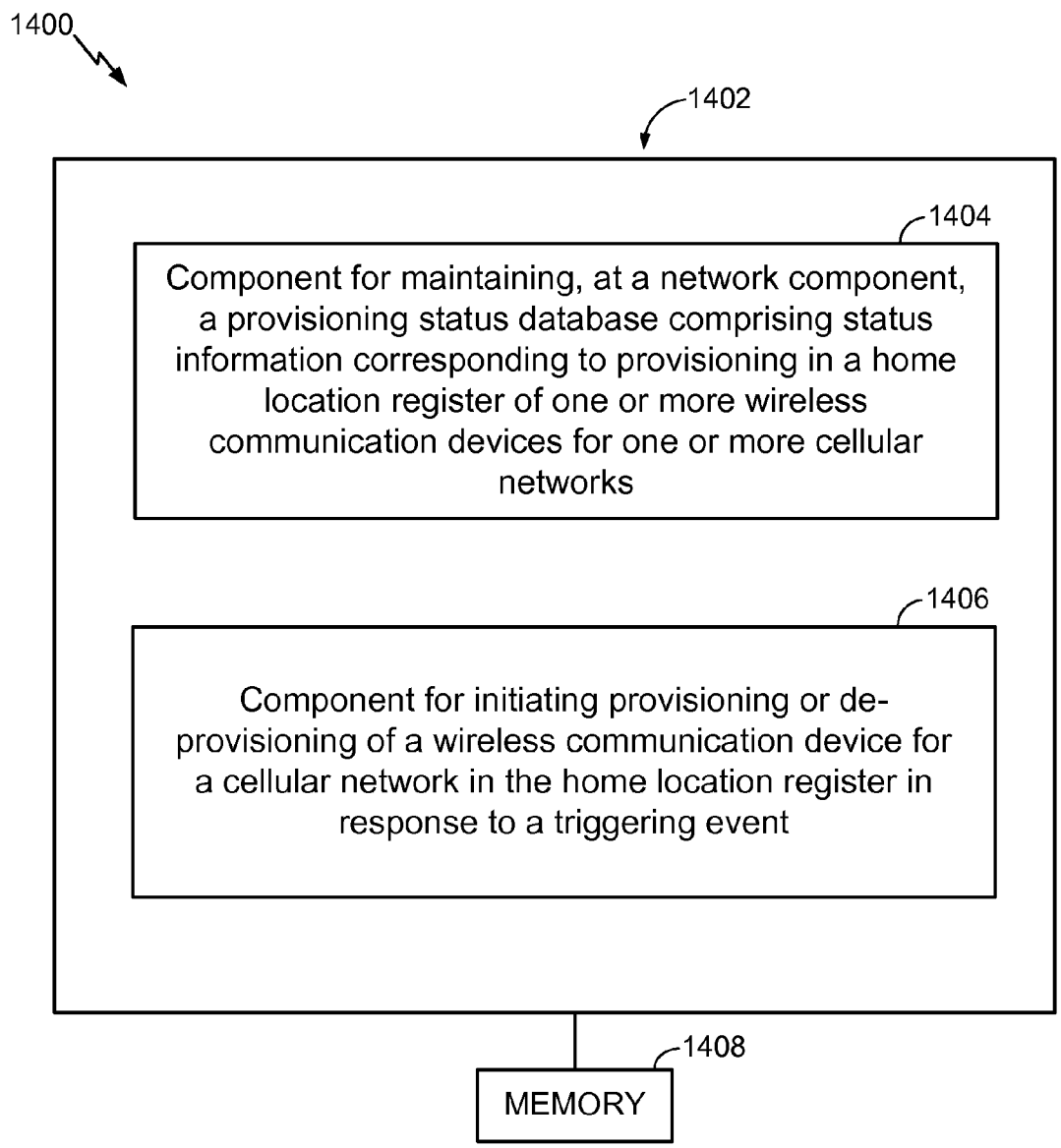
FIG. 14 is an illustration of an example system that facilitates controlling provisioning of a wireless communication device in a cellular network in accordance with an aspect.

Referring now to FIG. 14, illustrated is a system 1400 configured to control provisioning of a wireless communication device in a cellular network. For example, system 1400 can reside at least partially within a transmitter, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that facilitate controlling provisioning of a wireless communication device in a cellular network. For instance, logical grouping 1402 may include component 1404 for maintaining, at a network component, a provisioning status database comprising status information corresponding to provisioning in a home location register of one or more wireless communication devices for one or more cellular networks. Further, logical grouping 1402 may comprise component 1406 for initiating provisioning or de-provisioning of a wireless communication device for a cellular network in the home location register in response to a triggering event. Additionally, system 1400 can include a memory 1408 that retains instructions for executing functions associated with electrical components 1404 and 1406. While shown as being external to memory 1408, it is to be understood that one or more of electrical components 1404 and 1406 can exist within memory 1408.

Figure 15:
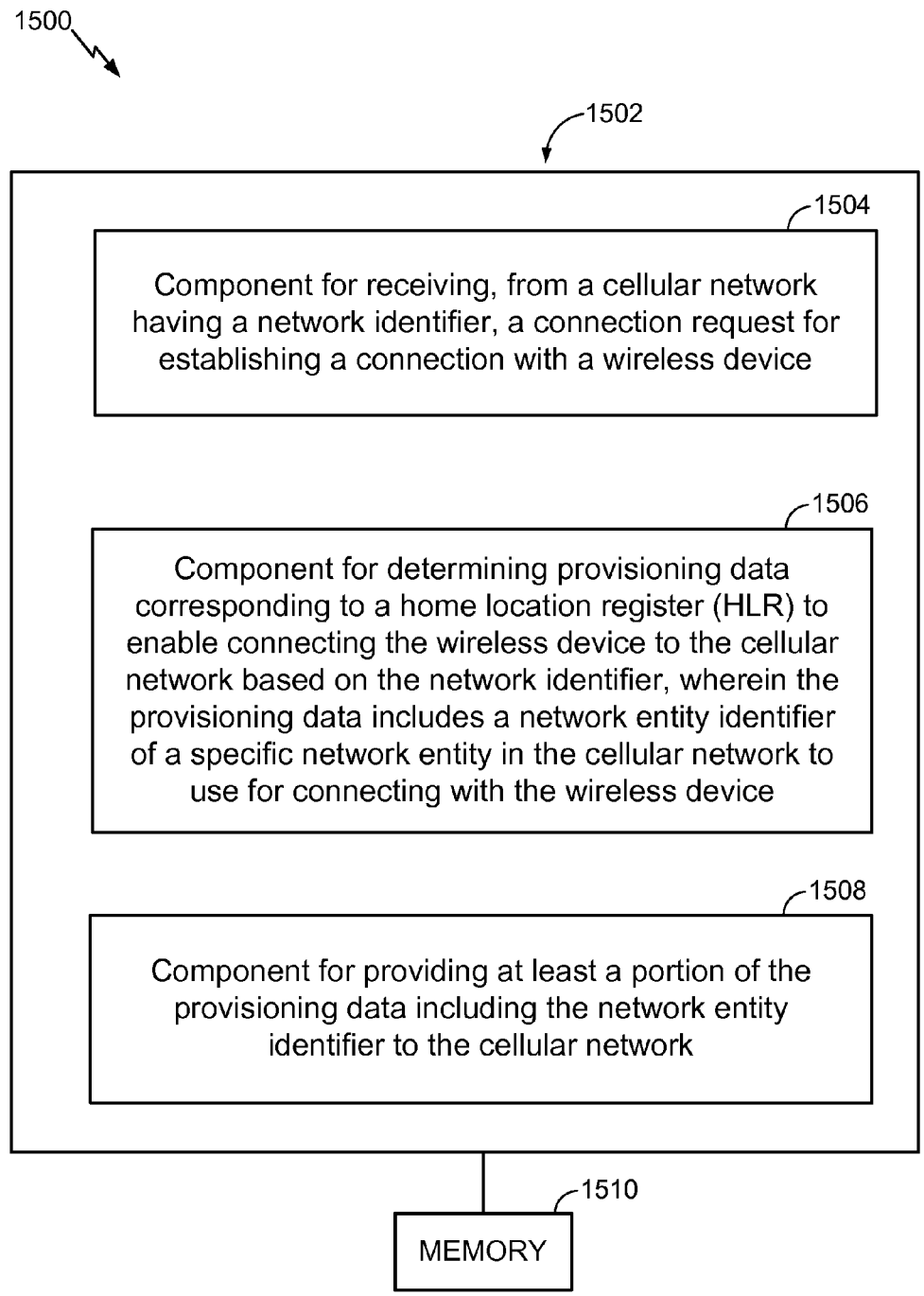
FIG. 15 is an illustration of an example system that facilitates controlling provisioning of a wireless communication device in a cellular network in accordance with still another aspect.

Referring now to FIG. 15, illustrated is a system 1500 configured to control provisioning of a wireless communication device in a cellular network. For example, system 1500 can reside at least partially within a transmitter, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that facilitate controlling provisioning of a wireless communication device in a cellular network. For instance, logical grouping 1502 may include component 1504 for receiving, from a cellular network having a network identifier, a connection request for establishing a connection with a wireless device. Further, logical grouping 1502 may comprise component 1506 for determining provisioning data corresponding to a home location register (HLR) to enable connecting the wireless device to the cellular network based on the network identifier, wherein the provisioning data includes a network entity identifier of a specific network entity in the cellular network to use for connecting with the wireless device. In addition, logical grouping 1502 may comprise component 1508 for providing at least a portion of the provisioning data including the network entity identifier to the cellular network. Additionally, system 1500 can include a memory 1510 that retains instructions for executing functions associated with electrical components 1504, 1506 and 1508. While shown as being external to memory 1510, it is to be understood that one or more of electrical components 1504, 1506 and 1508 can exist within memory 1510.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of controlling provisioning of a wireless communication device in a cellular network, comprising:
   maintaining, at a network component, a provisioning status database comprising status information corresponding to provisioning in a home location register of one or more wireless communication devices for one or more cellular networks;
   initiating provisioning or de-provisioning of the wireless communication device for the cellular network in the home location register in response to a triggering event, wherein the provisioning of the wireless communication device for the cellular network comprises obtaining, from a master database having a plurality of provisioning data for a plurality of wireless communication devices and a plurality of cellular networks, provisioning data corresponding to a device identifier of the wireless communication device and a network identifier of the cellular network;
   receiving signaling corresponding to a request for the wireless communication device to connect to the cellular network, wherein the signaling includes the device identifier corresponding to the wireless communication device and the network identifier corresponding to the cellular network, and wherein the signaling corresponding to the request comprises the triggering event; and
   determining from the status information in the provisioning status database, in response to the request and based on the device identifier and the network identifier, that the wireless communication device is not provisioned in the home location register;
   wherein initiating provisioning or de-provisioning comprises transmitting a provisioning message destined for the home location register, wherein the provisioning message includes the provisioning data and the device identifier.

2. The method of claim 1, wherein the provisioning message initiates creation in the home location register of a provisioning record for the wireless communication device on the cellular network.

3. The method of claim 1, further comprising:
   receiving provisioning data for the wireless communication device; and
   transmitting the provisioning data to a master database for storage until occurrence of the triggering event that causes initiating of the provisioning at the home location register.

4. The method of claim 3, further comprising:
   transmitting at least a portion of the provisioning data to the wireless communication device in response to a provisioning data query received from the wireless device.

5. The method of claim 1, wherein the home location register is configured to store a plurality of provisioning data corresponding to a plurality of different network carriers.

6. The method of claim 1, wherein the provisioning status database comprises a device identifier field and a network identifier field.

7. The method of claim 1, further comprising:
   receiving subscription data corresponding to the wireless communication device.

8. The method of claim 7, further comprising:
   storing, in a master database, the subscription data corresponding to the wireless communication device.

9. The method of claim 8, further comprising:
   receiving modified subscription data corresponding to the wireless communication device; and
   storing, in the master database, the modified subscription data corresponding to the wireless communication device.

10. A method of controlling provisioning of a wireless communication device in a cellular network, comprising:
    maintaining, at a network component, a provisioning status database comprising status information corresponding to provisioning in a home location register of one or more wireless communication devices for one or more cellular networks;
    initiating provisioning or de-provisioning of the wireless communication device for the cellular network in the home location register in response to a triggering event, wherein the provisioning of the wireless communication device for the cellular network comprises obtaining, from a master database having a plurality of provisioning data for a plurality of wireless communication devices and a plurality of cellular networks, provisioning data corresponding to a device identifier of the wireless communication device and a network identifier of the cellular network; and
    determining an occurrence of a de-provisioning condition, wherein the occurrence of the de-provisioning condition comprises the triggering event,
    wherein initiating provisioning or de-provisioning comprises transmitting a de-provisioning message destined for the home location register, and
    wherein the de-provisioning message initiates removing from the home location register a provisioning record comprising provisioning data for the wireless communication device on the cellular network.

11. The method of claim 10, wherein determining the occurrence of the de-provisioning condition comprises determining that a capacity for storing provisioning records in the home location register has reached a capacity threshold level.

12. The method of claim 10, wherein determining the occurrence of the de-provisioning condition comprises determining inactivity of the wireless communication device on the cellular network has reached an inactivity threshold level.

13. The method of claim 10, wherein determining the occurrence of the de-provisioning condition comprises receiving signaling corresponding to a request for the wireless communication device to disconnect from the cellular network, wherein the signaling includes a device identifier corresponding to the wireless communication device and a network identifier corresponding to the cellular network.

14. At least one processor configured to control provisioning of a wireless communication device in a cellular network:
    a first module for maintaining, at a network component, a provisioning status database comprising status information corresponding to provisioning in a home location register of one or more wireless communication devices for one or more cellular networks;
    a second module for initiating provisioning or de-provisioning of the wireless communication device for the cellular network in the home location register in response to a triggering event, wherein the module for initiating the provisioning of the wireless communication device for the cellular network is configured to obtain, from a master database having a plurality of provisioning data for a plurality of wireless communication devices and a plurality of cellular networks, provisioning data corresponding to a device identifier of the wireless communication device and a network identifier of the cellular network;
    a third module for receiving signaling corresponding to a request for the wireless communication device to connect to the cellular network, wherein the signaling includes the device identifier corresponding to the wireless communication device and the network identifier corresponding to the cellular network, and wherein the signaling corresponding to the request comprises the triggering event; and a fourth module for determining from the status information in the provisioning status database, in response to the request and based on the device identifier and the network identifier, that the wireless communication device is not provisioned in the home location register, wherein initiating provisioning or de-provisioning comprises transmitting a provisioning message destined for the home location register, wherein the provisioning message includes the provisioning data and the device identifier.

15. A computer program product for controlling provisioning of a wireless communication device in a cellular network, comprising:

a non-transitory computer-readable medium comprising:
 a first set of codes for causing a computer to maintain, at a network component, a provisioning status database comprising status information corresponding to provisioning in a home location register of one or more wireless communication devices for one or more cellular networks; and a second set of codes for causing the computer to initiate provisioning or de-provisioning of the wireless communication device for the cellular network in the home location register in response to a triggering event, wherein the second set of codes for the provisioning of the wireless communication device for the cellular network is configured to obtain, from a master database having a plurality of provisioning data for a plurality of wireless communication devices and a plurality of cellular networks, provisioning data corresponding to a device identifier of the wireless communication device and a network identifier of the cellular network;

a third set of codes for causing the computer to receive signaling corresponding to a request for the wireless communication device to connect to the cellular network, wherein the signaling includes the device identifier corresponding to the wireless communication device and the network identifier corresponding to the cellular network, and wherein the signaling corresponding to the request comprises the triggering event; and a fourth set of codes for causing the computer to determine from the status information in the provisioning status database, in response to the request and based on the device identifier and the network identifier, that the wireless communication device is not provisioned in the home location register, wherein initiating provisioning or de-provisioning comprises transmitting a provisioning message destined for the home location register, wherein the provisioning message includes the provisioning data and the device identifier.

16. An apparatus for controlling provisioning of a wireless communication device in a cellular network, comprising:

means for maintaining, at a network component, a provisioning status database comprising status information corresponding to provisioning in a home location register of one or more wireless communication devices for one or more cellular networks;

means for initiating provisioning or de-provisioning of the wireless communication device for the cellular network in the home location register in response to a triggering event, wherein the means for initiating the provisioning of the wireless communication device for the cellular network is operable to initiate provisioning of the wireless communication device for the cellular network by obtaining, from a master database having a plurality of provisioning data for a plurality of wireless communication devices and a plurality of cellular networks, provisioning data corresponding to a device identifier of the wireless communication device and a network identifier of the cellular network;

means for receiving signaling corresponding to a request for the wireless communication device to connect to the cellular network, wherein the signaling includes the device identifier corresponding to the wireless communication device and the network identifier corresponding to the cellular network, and wherein the signaling corresponding to the request comprises the triggering event; and means for determining from the status information in the provisioning status database, in response to the request and based on the device identifier and the network identifier, that the wireless communication device is not provisioned in the home location register, wherein initiating provisioning or de-provisioning comprises transmitting a provisioning message destined for the home location register, wherein the provisioning message includes the provisioning data and the device identifier.

17. An apparatus for controlling provisioning of a wireless communication device in a cellular network, comprising:

a provisioning status database operable to maintain status information corresponding to provisioning in a home location register of one or more wireless communication devices for one or more cellular networks;

a home location register manager component operable to initiate provisioning or de-provisioning of the wireless communication device for the cellular for a cellular network in the home location register in response to a triggering event; and an activation engine operable to provision the wireless communication device for the cellular network by obtaining, from a master database having a plurality of provisioning data for a plurality of wireless communication devices and a plurality of cellular networks, provisioning data corresponding to a device identifier of the wireless communication device and a network identifier of the cellular network, wherein the activation engine is further operable to receive signaling corresponding to a request for the wireless communication device to connect to the cellular network, wherein the signaling includes the device identifier corresponding to the wireless communication device and the network identifier corresponding to the cellular network, and the signaling corresponding to the request comprises the triggering event, and wherein the activation engine is further operable to determine from the status information in the provisioning status database, in response to the request and based on the device identifier and the network identifier, that the wireless communication device is not provisioned in the home location register.

18. The apparatus of claim 17, wherein the home location manager component is further operable to transmit a provisioning message destined for the home location register, wherein the provisioning message includes the provisioning data and the device identifier.

19. The apparatus of claim 18, wherein the provisioning message initiates creation in the home location register of a provisioning record for the wireless communication device on the cellular network.

20. The apparatus of claim 17,
wherein the activation engine is further operable to receive provisioning data for the wireless communication device and transmit the provisioning data to a master database for storage until occurrence of the triggering event that causes initiating of the provisioning at the home location register.

21. The apparatus of claim 20, wherein the activation engine is further operable to transmit at least a portion of the provisioning data to the wireless communication device in response to a provisioning data query received from the wireless device.

22. The apparatus of claim 17, wherein the home location register is configured to store a plurality of provisioning data corresponding to a plurality of different network carriers.

23. The apparatus of claim 17, wherein the provisioning status database comprises a device identifier field and a network identifier field.

24. The apparatus of claim 17,
wherein the activation engine is further operable to receive subscription data corresponding to the wireless communication device.

25. The apparatus of claim 24, wherein the activation engine is further operable to store, in a master database, the subscription data corresponding to the wireless communication device.

26. The apparatus of claim 25, wherein the activation engine is further operable to receive modified subscription data corresponding to the wireless communication device and store, in the master database, the modified subscription data corresponding to the wireless communication device.

27. An apparatus for controlling provisioning of a wireless communication device in a cellular network, comprising:
a provisioning status database operable to maintain status information corresponding to provisioning in a home location register of one or more wireless communication devices for one or more cellular networks; and
a home location register manager component operable to initiate provisioning or de-provisioning of the wireless communication device for the cellular for a cellular network in the home location register in response to a triggering event, and
an activation engine operable to provision the wireless communication device for the cellular network by obtaining, from a master database having a plurality of provisioning data for a plurality of wireless communication devices and a plurality of cellular networks, provisioning data corresponding to a device identifier of the wireless communication device and a network identifier of the cellular network,
wherein the activation engine is further operable to determine an occurrence of a de-provisioning condition, and
wherein the occurrence of the de-provisioning condition comprises the triggering event,
wherein the home location manager component is further operable to transmit a de-provisioning message destined for the home location register, and
wherein the de-provisioning message initiates removing from the home location register a provisioning record comprising provisioning data for the wireless communication device on the cellular network.

28. The apparatus of claim 27, wherein determining the occurrence of the de-provisioning condition comprises determining that a capacity for storing provisioning records in the home location register has reached a capacity threshold level.

29. The apparatus of claim 27, wherein determining the occurrence of the de-provisioning condition comprises determining inactivity of the wireless communication device on the cellular network has reached an inactivity threshold level.

30. The apparatus of claim 27, wherein determining the occurrence of the de-provisioning condition comprises receiving signaling corresponding to a request for the wireless communication device to disconnect from the cellular network, wherein the signaling includes a device identifier corresponding to the wireless communication device and a network identifier corresponding to the cellular network.

* * * * *